(12) United States Patent
Park

(10) Patent No.: US 12,301,392 B2
(45) Date of Patent: May 13, 2025

(54) MULTI-PHASE VECTOR SYNTHESIS DEMODULATION METHOD AND APPARATUS

(71) Applicant: Chun Soo Park, Seoul (KR)

(72) Inventor: Chun Soo Park, Seoul (KR)

(*) Notice: Subject to any disclaimer, the term of this patent is extended or adjusted under 35 U.S.C. 154(b) by 345 days.

(21) Appl. No.: 17/963,604

(22) Filed: Oct. 11, 2022

(65) Prior Publication Data

US 2024/0121142 A1    Apr. 11, 2024

(51) Int. Cl.
*H04L 27/36* (2006.01)
*H04L 27/233* (2006.01)

(52) U.S. Cl.
CPC ........ *H04L 27/2334* (2013.01); *H04L 27/364* (2013.01)

(58) Field of Classification Search
None
See application file for complete search history.

(56) References Cited

U.S. PATENT DOCUMENTS

| | | | |
|---|---|---|---|
| 6,560,449 | B1 | 5/2003 | Liu |
| 11,221,237 | B2 | 1/2022 | Park |
| 2018/0138929 | A1* | 5/2018 | Ellä ............... H04B 1/0057 |
| 2021/0310830 | A1* | 10/2021 | Park ............... H02K 24/00 |
| 2021/0310831 | A1* | 10/2021 | Park ............... G01D 5/2046 |
| 2021/0310832 | A1* | 10/2021 | Park ............... H02K 1/14 |

OTHER PUBLICATIONS

"Bandpass Modulation and Demodulation", pp. 142-144, Chap. 3 (Bernard Sklar, Digital Communications—Fundamentals and Applications, Prentice Hall, Englewood Cliffs, New Jersey, 1988).
Chris K. Park et al., Multiphase Sensor Signal Processing, IEEE Sensors Letters, vol. 6, Jun. 2022.

* cited by examiner

*Primary Examiner* — Kodzovi Acolatse
(74) *Attorney, Agent, or Firm* — LRK PATENT LAW FIRM

(57) ABSTRACT

An N-phase vector synthesis demodulator employing N number of mixers is presented. The received signal is mixed with locally generated N number of phase-shifted carrier signals at the N mixers, the individual phases of which are successively and equally 360°/N shifted. The final in-phase (I) and quadrature-phase (Q) signals are zero-force synthesized from the demodulated N-phase vector signals. Compared with the conventional I/Q demodulator that obtains the I and Q signals directly from two mixers of 0° and 90° carrier signal phases, the multi-phase demodulator provides significantly high linearities in the demodulated I and Q signals as the zero-force synthesizer performs an optimal combining of the N-phase demodulated signals while minimizing distortions, interferences, and noise.

1 Claim, 24 Drawing Sheets

MULTI-PHASE VECTOR SYNTHESIS DEMODULATION METHOD AND APPARATUS

BACKGROUND

1. Technical Field

The claimed subject matter relates to demodulation in communication systems: particularly a novel multi-phase vector synthesis method and apparatus for the demodulation of a received phase-modulated signal in communication systems.

2. Description of Related Art

In communication systems, the communication between a transmitter and a receiver is made via the transmittance of a modulated signal at the transmitter and the subsequent demodulation of the received signal at the receiver. In general, the amplitude and phase of the baseband signal that contains the information is radio-frequency modulated to transmit at a long distance. To recover the amplitude and phase of the signal at the receiver, in-phase and quadrature-phase demodulation (I/Q demodulation) is generally and conventionally used, as illustrated in FIG. 1 of U.S. Pat. No. 6,560,449 B1 and in FIG. 3.12 (page 144) in Reference [1] (Bernard Sklar, Digital Communications—Fundamentals and Applications, Prentice Hall, Englewood Cliffs, New Jersey, 1988).

A simplified block diagram of an analog communication system employing the I/Q demodulator is depicted in FIG. 1, where the baseband signal $F_m(t)$ is mixed with a high frequency carrier $F_c$, amplified through a linear power amplifier (LPA), and transmitted through the antenna. The received signal is amplified through a low-noise amplifier (LNA) and down-converted to a baseband signal via the mixing of the in-phase and quadrature-phase (I/Q) signals of the carrier $F_c$ signal. In FIG. 2, a simplified block diagram of a code-division spread spectrum communication system employing the I/Q demodulator is depicted, where each information bit is randomized with a pseudo-noise (PN) code at the transmitter. In both FIG. 1 and FIG. 2, a single carrier is used for up-conversion; however, multiple orthogonal carriers are used in orthogonal frequency division multiplexing (OFDM) communication systems.

The transmitted signals are heavily interfered and generally very weak at the receiver, as in realistic communications links; phenomena such as refractions, diffractions, scatterings, and fadings are present as well as additive white Gaussian noise. For heavily impaired received signals, the conventional I/Q demodulator does not provide an optimal solution in the sense of minimizing the distortion and interference in the received signals.

The present invention has been made in light of the aforementioned background and discloses a novel method and apparatus to obtain significantly improved in-phase (I) and quadrature-phase (Q) signal components of the received signal. The in-phase (I) and quadrature-phase (Q) signals are synthesized from the output signal vectors of multi-phase mixers based on the principle of the zero-force synthesis method, which is disclosed in U.S. Pat. No. 11,221,237 B2 and in Reference [2] (C. K. Park, I. Lee, and C. S. Park, "Multiphase Sensor Signal Processing," IEEE Sensors Letters, vol. 6, no. 6, June 2022).

SUMMARY OF THE INVENTION

The following presents a simplified summary in order to provide a basic understanding of some aspects described herein.

In terms of general aspects, exemplary embodiments provide methods and apparatus of demodulator systems employing N number of mixers compared with the two I and Q mixers in conventional demodulation, where the N is an odd number greater than or equal to 3.

According to an aspect of the exemplary embodiments, the method of N-phase demodulation and vector synthesis includes generating N number of phase-shifted carrier signals, wherein each phase of the N phase-shifted carrier signals is successively and equally shifted by 360°/N, where the N is an odd number greater than or equal to 3; producing N-phase mixed signals by mixing a received signal with N number of phase-shifted carrier signals at N number of mixers; band-pass filtering the N-phase mixed signals and obtaining N-phase demodulated baseband signals by filtering out carrier signal components; and synthesizing in-phase (I) and quadrature-phase (Q) signals from the N-phase demodulated baseband signals via zero-force synthesis using pre-determined synthesis coefficients and gain.

According to an aspect of the exemplary embodiments, the N-phase demodulation and vector synthesis apparatus includes N number of local oscillators that generate N number of phase-shifted carrier signals, the individual phases of which are successively and equally shifted by 360°/N where N is an odd number greater than or equal to 3; N number of mixers for mixing the received carrier modulated signal, wherein the N number of phase-shifted carrier signals are applied to the N number of mixers, producing N-phase mixed signals; N number of band-pass filters for band-pass filtering the N-phase mixed signals and obtaining N-phase demodulated baseband signals by filtering out carrier signal components; and an N-phase zero-force synthesizer for synthesizing in-phase (I) and quadrature-phase (Q) signals from the N-phase demodulated baseband signals via zero-force synthesis, wherein pre-determined synthesis coefficients and gain are stored. The zero-force synthesizer produces the I and Q signals by applying first-order linear transformation to the N-phase demodulated baseband signals.

The received carrier modulated signal can be down-converted to an inter-mediate frequency that is lower than the carrier frequency.

The multi-phase and vector synthesis demodulator can also be realized by register-transfer-level (RTL) hardware or microprocessor software after the analog-to-digital conversion of received signals.

A performance comparison between a conventional I/Q demodulator and the multi-phase vector synthesis demodulator is presented for a 5-phase case under various channel impairments.

As an exemplary application of the multi-phase vector synthesis demodulator, a delay-code based synchronization scheme to achieve fine synchronization among the base stations in a mobile cellular network is presented.

One or more of the above-disclosed embodiments, in addition to certain alternatives, are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

DETAILED DESCRIPTION OF THE INVENTION

In the following, numerous specific details are described to provide a thorough description of various embodiments of the claimed subject matter. Certain embodiments may be practiced without these specific details or with some variations in the details. In some instances, certain features are described in less detail so as to not obscure other aspects of the disclosed embodiments. The level of detail associated with each of the elements or features should not be construed to qualify the novelty or importance of one feature over the others.

In what follows, the principle of the multi-phase vector synthesis demodulation method is explained for an N=5 case: 5-phase vector synthesis demodulation. Generalized arbitrary N-phase vector synthesis demodulation can be easily derived from the exemplary 5-phase vector synthesis demodulation.

Figure 1:
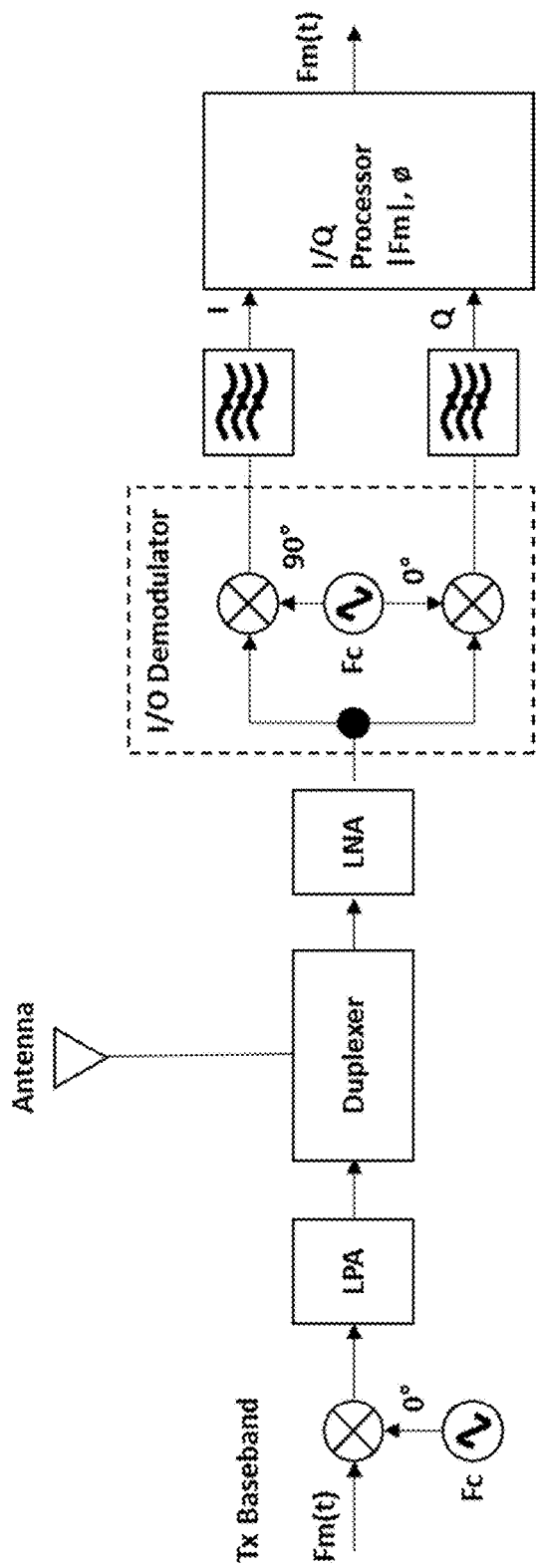
FIG. 1 illustrates a conventional analog communication system employing an I/Q demodulator.
Figure 2:
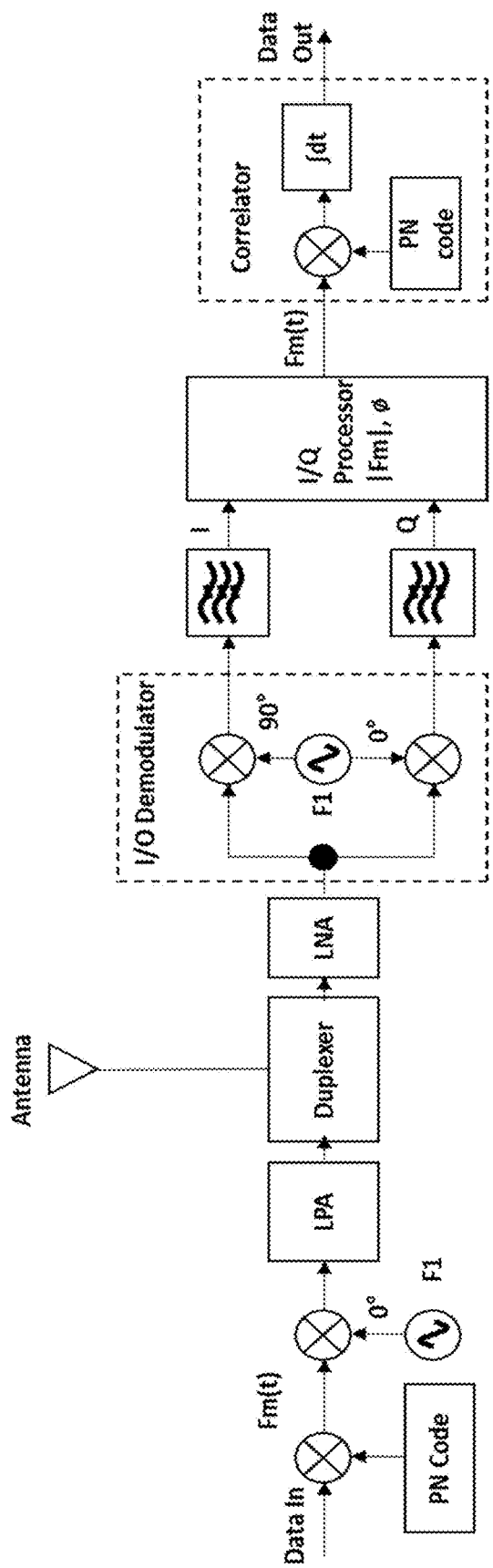
FIG. 2 illustrates a conventional spread spectrum digital communication system employing the I/Q demodulator.
Figure 3:
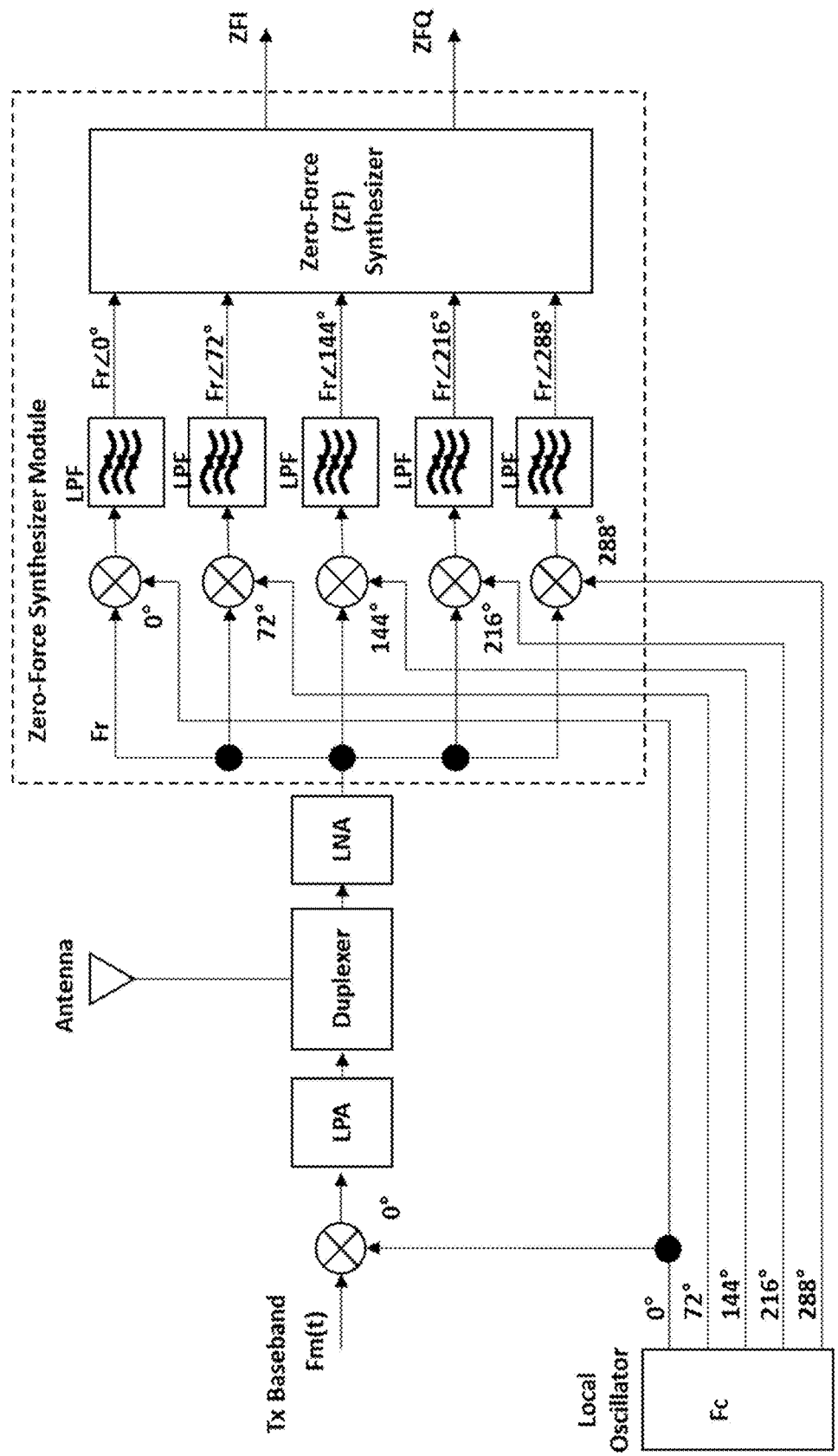
FIG. 3 illustrates an exemplary communication system employing a 5-phase vector synthesis demodulator according to the present invention.

FIG. 3 depicts a simplified block diagram of a communication system employing the 5-phase vector synthesis demodulator, where the baseband signal ($F_m(t)$) is mixed with a high-frequency carrier $F_c$, amplified through a linear power amplifier (LPA), and transmitted through an antenna.

The received signal at the receiver is amplified through a low-noise amplifier (LNA). Compared with the two mixers of conventional I/Q mixers, the phases of which are 0° and 90°, five mixers are used in FIG. 3. The five mixers mix the LNA output signal (F r) with the five phase-shifted carrier signals ($F_c$), the phases of which are 0°, 72°, 144°, 216°, and 288° shifted from the phase of carrier signal $F_c$. For N-phase demodulation, N number of phase-shifted carrier signals are generated by one or more of the local oscillators.

Let the angular frequency of the carrier signal be $\omega=2\pi F_c$ and the phase of the baseband signal $F_m(t)$ be $\varphi$; then, the output signals of the five mixers can be expressed as follows:

$$\sin(\omega t+\varphi)*\sin(\omega t+0)=\tfrac{1}{2}\{\cos(\varphi-0)-\cos(2\omega t+\varphi+0)\}$$

$$\sin(\omega t+\varphi)*\sin(\omega t+72)=\tfrac{1}{2}\{\cos(\varphi-72)-\cos(2\omega t+\varphi+72)\}$$

$$\sin(\omega t+\varphi)*\sin(\omega t+144)=\tfrac{1}{2}\{\cos(\varphi-144)-\cos(2\omega t+\varphi+144)\}$$

$$\sin(\omega t+\varphi)*\sin(\omega t+216)=\tfrac{1}{2}\{\cos(\varphi-216)-\cos(2\omega t+\varphi+216)\}$$

$$\sin(\omega t+\varphi)*\sin(\omega t+288)=\tfrac{1}{2}\{\cos(\varphi-288)-\cos(2\omega t+\varphi+288)\} \quad \text{EQ. (1)}$$

The five mixers produce 5-phase mixed signals that are subsequently low-pass filtered (LPF) or band-pass filtered in general. As the frequency ($F_c$) of the carrier signal is much higher than that of the baseband signal $F_m(t)$, the $2\omega t$ component in EQ. (1) is filtered out by the LPF or BPF.

Let the LPF or BPF output signals—5-phase demodulated baseband signals—be $|F_r|\angle 0°$, $|F_r|\angle 72°$, $|F_r|\angle 144°$, $|F_r|\angle 216°$, and $|F_r|\angle 288°$, respectively, then the 5-phase demodulated baseband signals are expressed in EQ. (2) after ignoring the common factor ½.

$$|F_r|\angle 0° = \cos(\varphi - 0) = \cos(\varphi)*\cos(0) + \sin(\varphi)*\sin(0) \quad \text{EQ. (2)}$$

$$= 1.000*\cos(\varphi) + 0.000*\sin(\varphi)$$

$$|F_r|\angle 72° = \cos(\varphi - 72) = \cos(\varphi)*\cos(72) + \sin(\varphi)*\sin(72)$$

$$= 0.309*\cos(\varphi) + 0.951*\sin(\varphi)$$

$$|F_r|\angle 144° = \cos(\varphi - 144) = \cos(\varphi)*\cos(144) + \sin(\varphi)*\sin(144)$$

$$= -0.809*\cos(\varphi) + 0.588*\sin(\varphi)$$

$$|F_r|\angle 216° = \cos(\varphi - 216) = \cos(\varphi)*\cos(216) + \sin(\varphi)*\sin(216)$$

$$= -0.809*\cos(\varphi) - 0.588*\sin(\varphi)$$

$$|F_r|\angle 288° = \cos(\varphi - 288) = \cos(\varphi)*\cos(288) + \sin(\varphi)*\sin(288)$$

$$= 0.309*\cos(\varphi) - 0.951*\sin(\varphi)$$

EQ. (2) implies that the 5 demodulated baseband signals contain their orthogonal signal components such that the cos ($\varphi$) signal component in $|F_r|\angle 0°$, $|F_r|\angle 72°$, $|F_r|\angle 144°$, $|F_r|\angle 216°$, and $|F_r|\angle 288°$ is 100%, 30.9%, −80.9%, −80.9%, and 30.9%, respectively, and the sin($\varphi$) signal component in $|F_r|\angle 0°$, $|F_r|\angle 72°$, $|F_r|\angle 144°$, $|F_r|\angle 216°$, and $|F_r|\angle 288°$ is 0%, 95.1%, 58.8%, −58.8%, and −95.1%, respectively.

EQ. (2) are first-order linear equations with two unknown variables: in-phase cos ($\varphi$) and quadrature-phase sin ($\varphi$) signals. EQ. (2) can be rewritten in matrix form as follows:

$$\begin{bmatrix} |F_r|\angle 0° \\ |F_r|\angle 72° \\ |F_r|\angle 144° \\ |F_r|\angle 216° \\ |F_r|\angle 288° \end{bmatrix} = \begin{bmatrix} 1.000 & 0.000 \\ 0.309 & 0.951 \\ -0.809 & 0.588 \\ -0.809 & -0.588 \\ 0.309 & -0.951 \end{bmatrix} * \begin{bmatrix} \cos(\varphi) \\ \sin(\varphi) \end{bmatrix} \quad \text{EQ. (3)}$$

As disclosed in U.S. Pat. No. 11,221,237 B2 and in reference [2] under "Other Publications," the in-phase and quadrature-phase signals are synthesized from the five vectors $|F_r|\angle 0°$, $|F_r|\angle 144°$, $|F_r|\angle 216°$, and $|F_r|\angle 288°$ by solving EQ. (3). The solution is expressed in EQ. (4).

EQ. (4)

$$\begin{bmatrix} \cos(\varphi) \\ \sin(\varphi) \end{bmatrix} = \begin{bmatrix} 0.400 & 0.1236 & -0.3236 & -0.3236 & 0.1236 \\ 0.000 & 0.3804 & 0.2352 & -0.2352 & -0.3804 \end{bmatrix} * \begin{bmatrix} |F_r|\angle 0° \\ |F_r|\angle 72° \\ |F_r|\angle 144° \\ |F_r|\angle 216° \\ |F_r|\angle 288° \end{bmatrix}$$

Let the in-phase cos ($\varphi$) and quadrature-phase sin($\varphi$) signals be ZFI and ZFQ, respectively, then EQ. (4) can be re-written in the following first-order linear equations.

$$ZFI = \cos(\varphi) = (0.400*|F_r|\angle 0°) + (0.1236*|F_r|\angle 72°) + \quad \text{EQ. (5)}$$

$$(-0.3236*|F_r|\angle 144°) + (-0.3236*|F_r|\angle 216°) + (0.1236*|F_r|\angle 288°)$$

$$ZFQ = \sin(\varphi) = (0.000*|F_r|\angle 0°) + (0.3804*|F_r|\angle 72°) +$$

$$(0.2352*|F_r|\angle 144°) + (-0.2352*|F_r|\angle 216°) + (-0.3804*|F_r|\angle 288°)$$

Therefore, the 5-phase zero-force (ZF) synthesizer in FIG. 3 synthesizes the ZFI and ZFQ from the LPF output 5 vectors based on EQ. (5).

In an arbitrary N-phase vector synthesis demodulator, where N is preferred to be an odd number greater than or equal to 3, the received signal after the LNA is mixed with N phase-shifted carrier signals by N mixers, the individual phases of which are successively and equally shifted by 360°/N.

The output signals of the N mixers—the N-phase mixed signals—are low-pass filtered by N LPFs to produce the N-phase demodulated baseband signals. The N-phase ZF synthesizer is used to synthesize the ZFI and ZFQ signals from the N-phase demodulated baseband signals, $$|F_r|\angle 0°,\ |F_r|\angle \frac{360°}{N}*1,\ |F_r|\angle \left(\frac{360°}{N}\right)*2,\ \ldots,\ |F_r|\angle \left(\frac{360°}{N}\right)*(N-1).$$

The N mixers and/or N LPFs can be implemented using register-transfer-level (RTL) hardware or microprocessor-based software modules.

Referring to U.S. Pat. No. 11,221,237 B2 and reference [2] under "Other Publications," the ZF synthesizer performs an optimal combining of the N-phase vector signals to produce the most robust in-phase (I) and quadrature-phase (Q) signals. Physically, the ZF synthesizer selects signals so that the orthogonality between the I and Q signals is maximized by minimizing distortions or inferences induced in the received signal.

Performance Comparison

A performance comparison between the conventional I/Q demodulator and the multi-phase vector synthesis demodulator according to the embodiments of the present invention is presented. In what follows, computer simulations are performed for the 5-phase vector synthesis demodulator (simply referred to as the "5-phase demodulator") under various channel impairments, such as non-linear distortion, DC offsets, multi-path delay, and harmonics. The performances of the 5-phase demodulator are compared with those of the conventional I/Q demodulator.

Figure 4A:
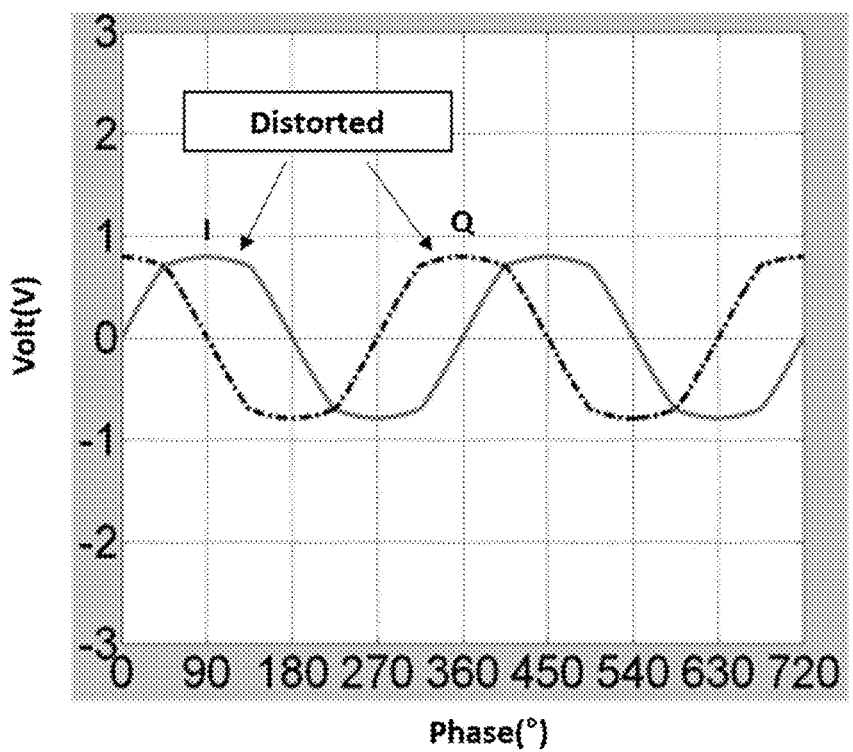
FIG. 4A plots non-linear distorted I and Q signals for computer simulation in the conventional I/Q demodulator.
Figure 4B:
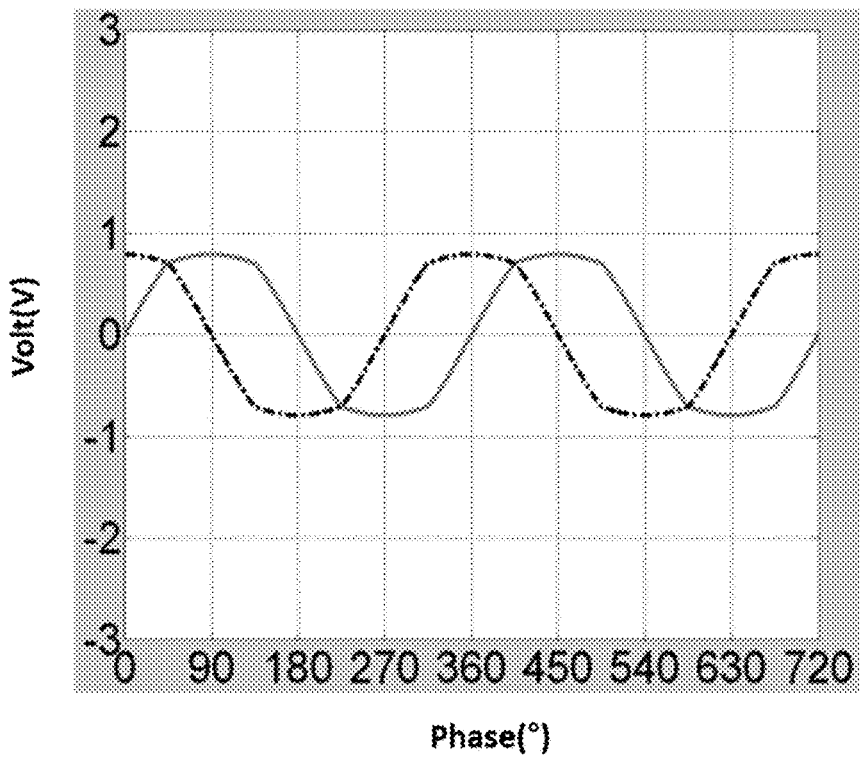
FIG. 4B plots non-linear distorted I and Q signals at the output of the conventional I/Q demodulator.
Figure 4C:
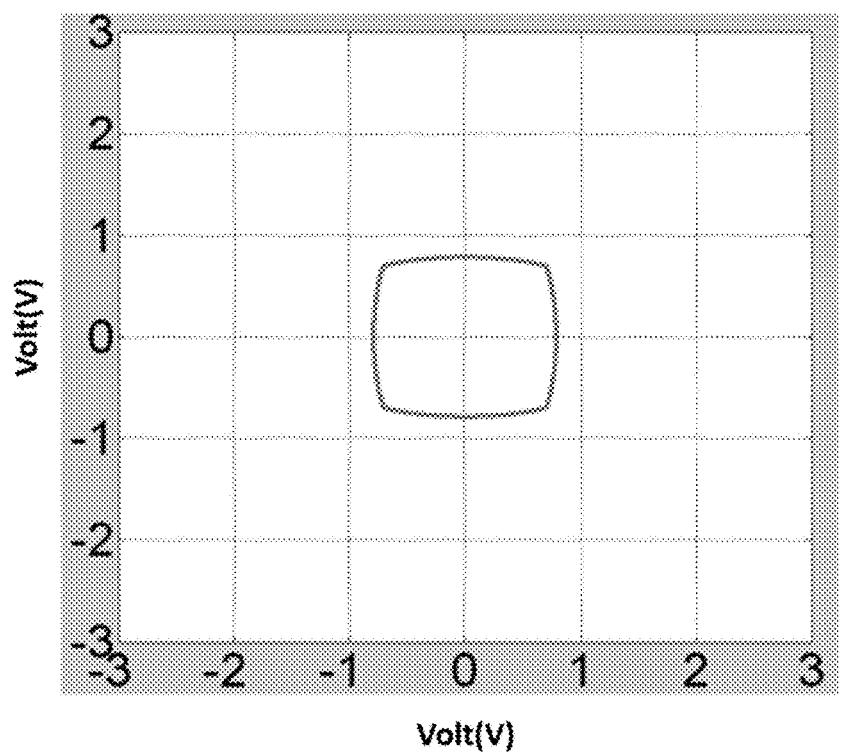
FIG. 4C plots a Lissajous graph of the I and Q signals in FIG. 4B in the conventional I/Q demodulator.
Figure 4D:
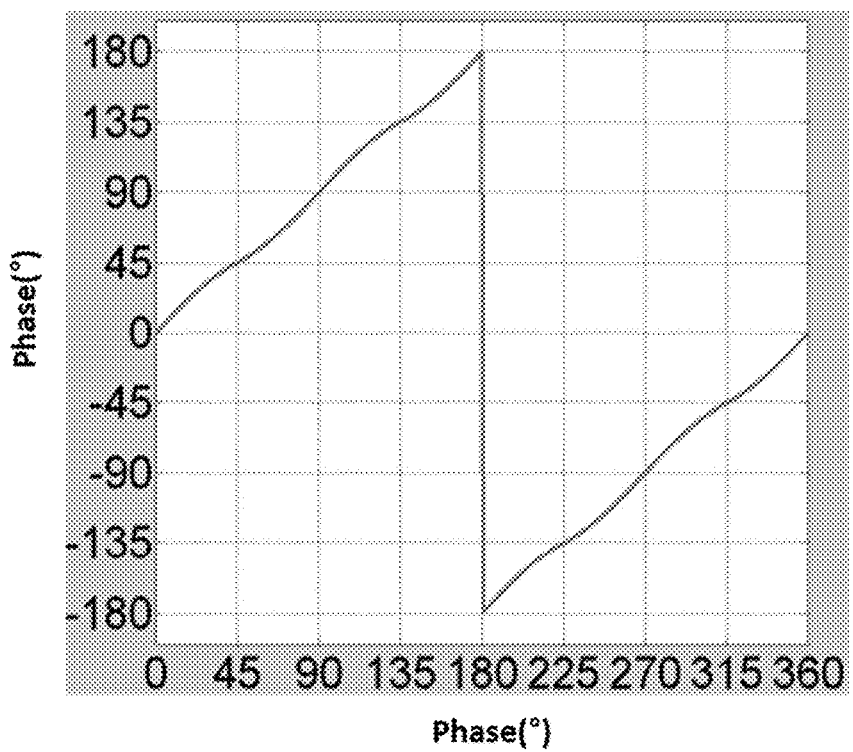
FIG. 4D plots a phase ($\varphi$=arctan(I/Q)) of the I and Q signals in FIG. 4B in the conventional I/Q demodulator.
Figure 4E:
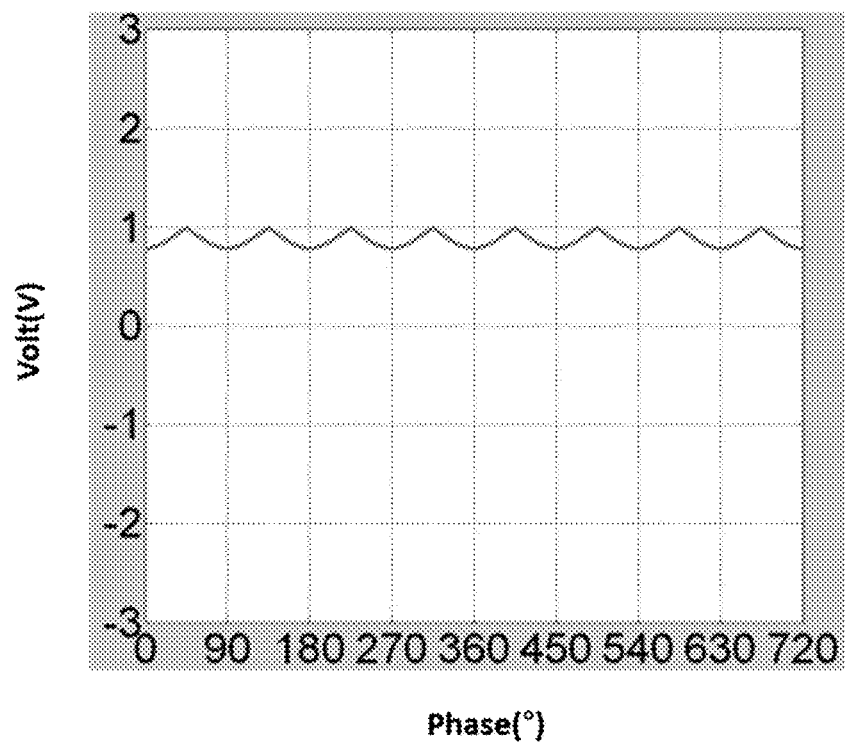
FIG. 4E plots an amplitude ($r=\sqrt{I^2+Q^2}$) of the I and Q signals in FIG. 4B in the conventional I/Q demodulator.

When the I and Q signals are non-linear distorted, as shown in FIG. 4A, the conventional I/Q demodulator outputs the same signal unless other noise is added in the demodulator, as in FIG. 4B. A Lissajous graph of the distorted I and Q signals of the conventional I/Q demodulator is drawn in FIG. 4C. As drawn in FIG. 4C, the Lissajous graph has the shape of a square, which implies the orthogonality between the I and Q signals does not hold except at 0° and 90°. The phase $\varphi$ of the I and Q signals that is calculated by $\varphi=\arctan(I/Q)$ shows non-linearities except around 0° and 90°, as drawn in FIG. 4D, over $2\pi$ ranges. The absolute amplitude of the I and Q signals that is calculated by $r=\sqrt{I^2+Q^2}$ also shows some ripples, as drawn in FIG. 4E, over $4\pi$ ranges. Since the conventional I/Q demodulation mixes the received signal with the I (0°) and Q (90°) signals, the output signals are only valid at 0° (I-signal) and 90° (Q-signal), and the orthogonality between the demodulated signals holds only around 0° and 90°.

Figure 5A:
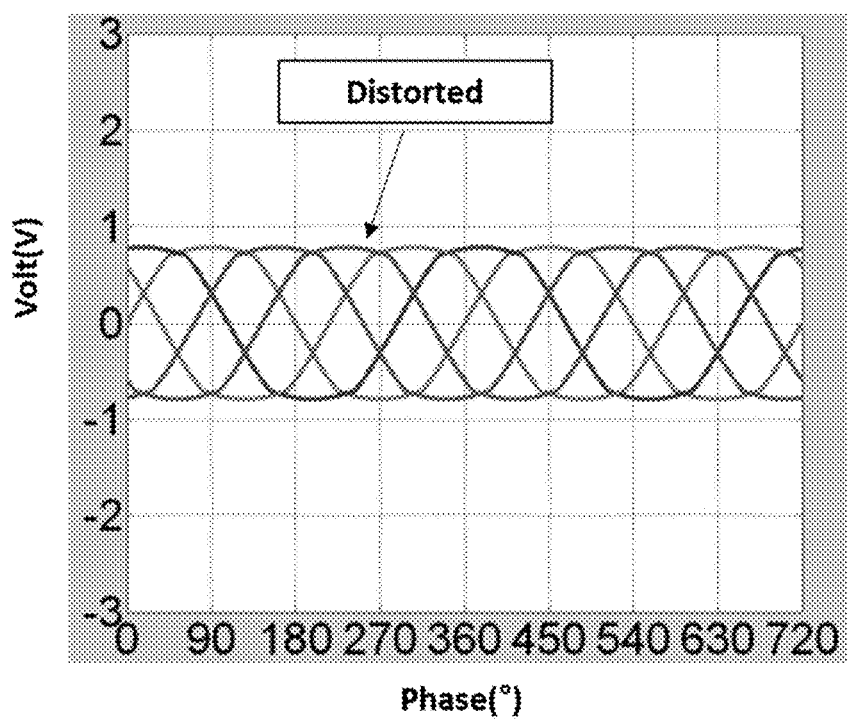
FIG. 5A plots non-linear distorted 5-phase signals for computer simulation in the 5-phase vector synthesis demodulator according to the present invention.
Figure 5B:
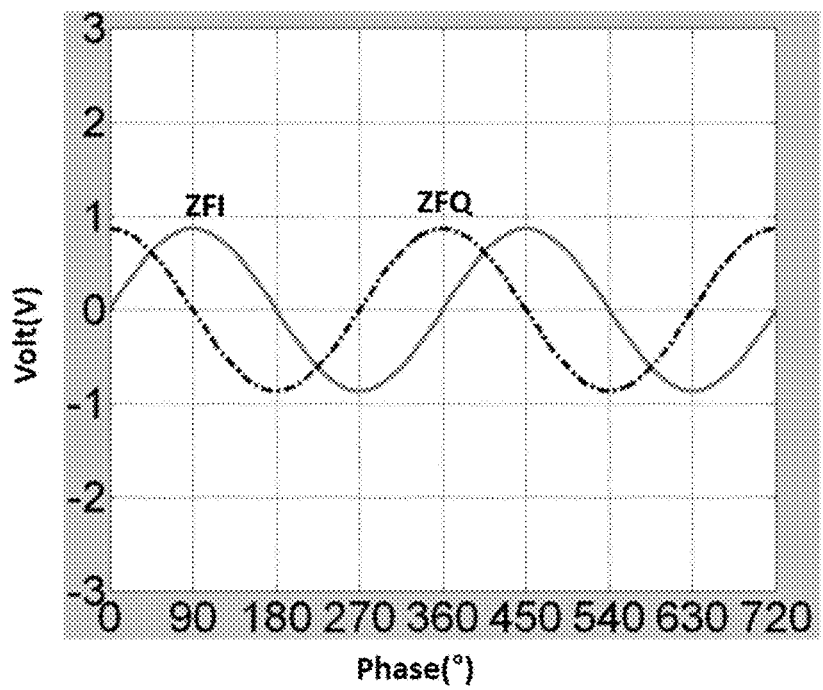
FIG. 5B plots ZFI and ZFQ signals at the ZF synthesizer output for the signals in FIG. 5A in the 5-phase vector synthesis demodulator according to the present invention.
Figure 5C:
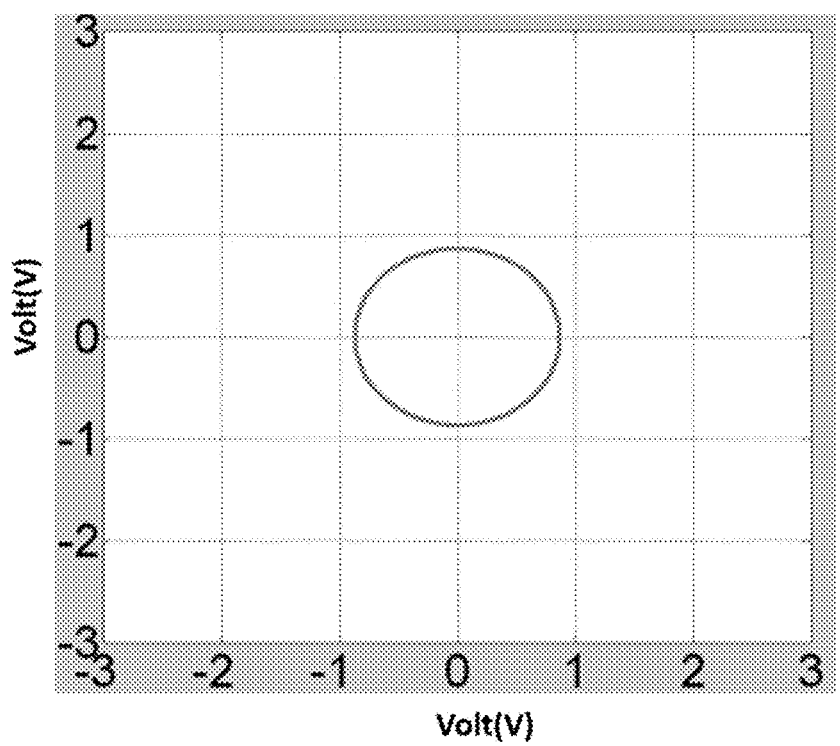
FIG. 5C plots a Lissajous graph of the ZFI and ZFQ signals in FIG. 5B in the 5-phase vector synthesis demodulator according to the present invention.
Figure 5D:
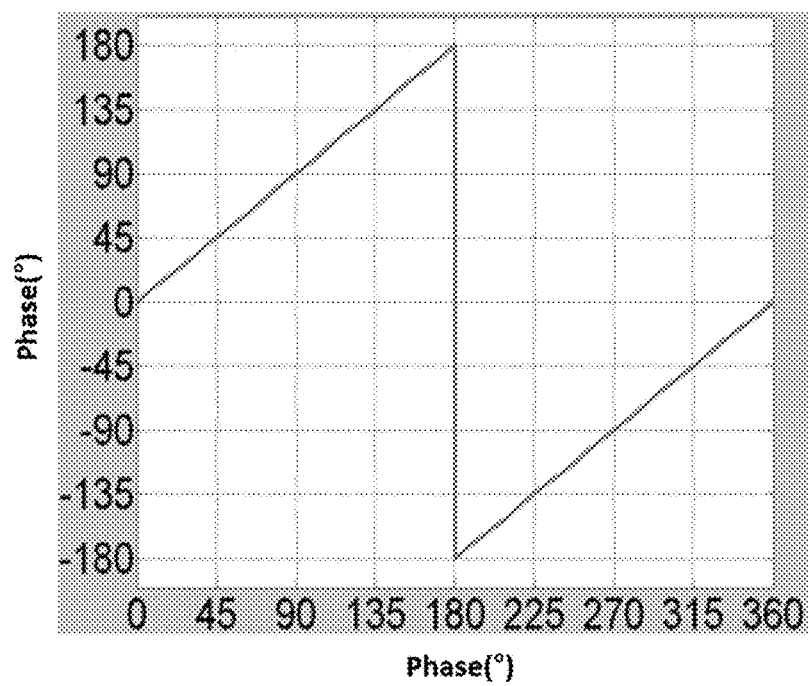
FIG. 5D plots a phase ($\varphi$=arctan(ZF I/ZFQ)) of the ZFI and ZFQ signals in FIG. 5B in the 5-phase vector synthesis demodulator according to the present invention.
Figure 5E:
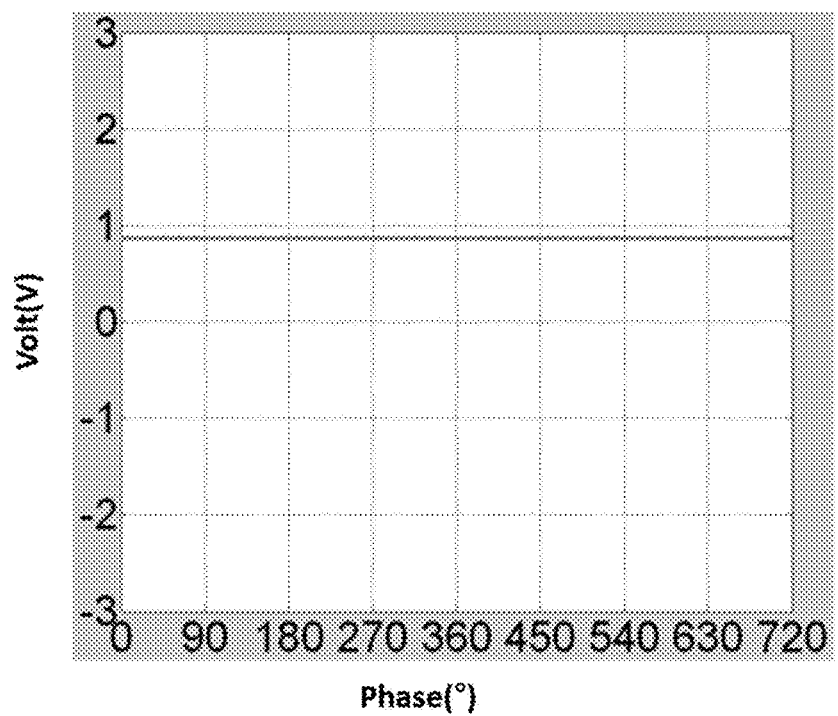
FIG. 5E plots an amplitude ($r=\sqrt{ZFI^2+ZFQ^2}$) of the ZFI and ZFQ signals in FIG. 5B in the 5-phase vector synthesis demodulator according to the present invention.

On the other hand, when the five LPF output signals, $|F_r|\angle 0°$, $|F_r|\angle 72°$, $|F_r|\angle 144°$, $|F_r|\angle 216°$, and $|F_r|\angle 288°$, in FIG. 3, are non-linear distorted in the same way as in FIG. 4A, the equally distorted 5-phase signals are drawn in FIG. 5A. When these distorted 5-phase signals are fed into the 5-phase ZF synthesizer, the output in-phase (ZFI) and quadrature-phase (ZFQ) signals are very close to ideal $\cos(\varphi)$ and $\sin(\varphi)$ signals, respectively, as drawn in FIG. 5B. Their Lissajous graph is also very close to an ideal circle, as drawn in FIG. 5C. This proves that the orthogonality between the ZFI and ZFQ holds very well over a whole 360° range. In FIG. 5D and FIG. 5E, the phase ($\varphi=\arctan(ZFI/ZFQ)$) and absolute amplitude ($r=\sqrt{ZFI^2+ZFQ^2}$) is drawn, respectively. The phase response is linear and the amplitude response is flat throughout one period of $2\pi$. This implies that the orthogonality between ZFI and ZFQ is recovered significantly by EQ. (5) even when the received signals are non-linear distorted.

Figure 6A:
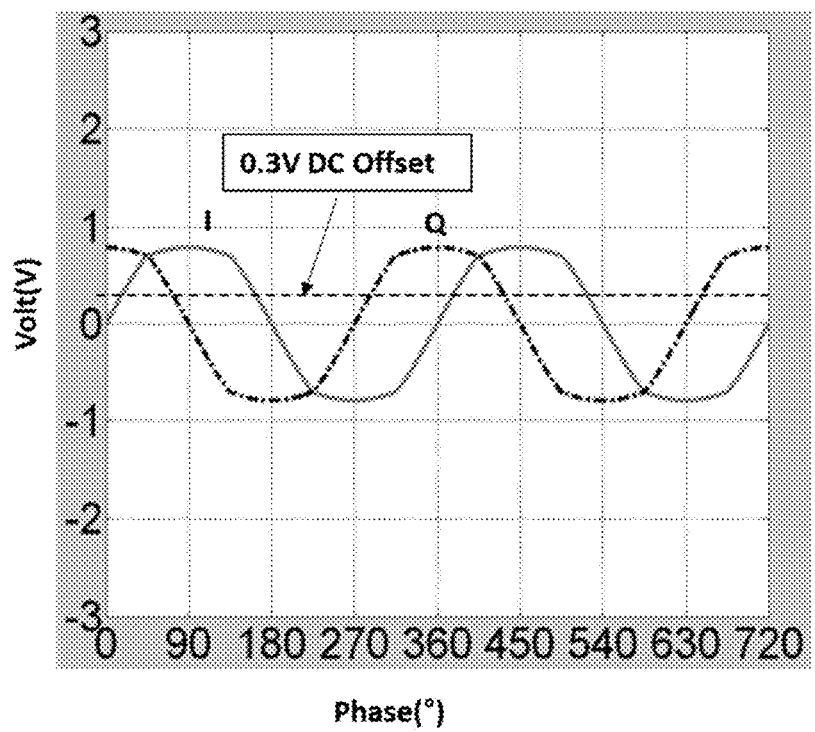
FIG. 6A plots non-linear distorted I and Q signals with 0.3V DC offset in the conventional I/Q demodulator.
Figure 6B:
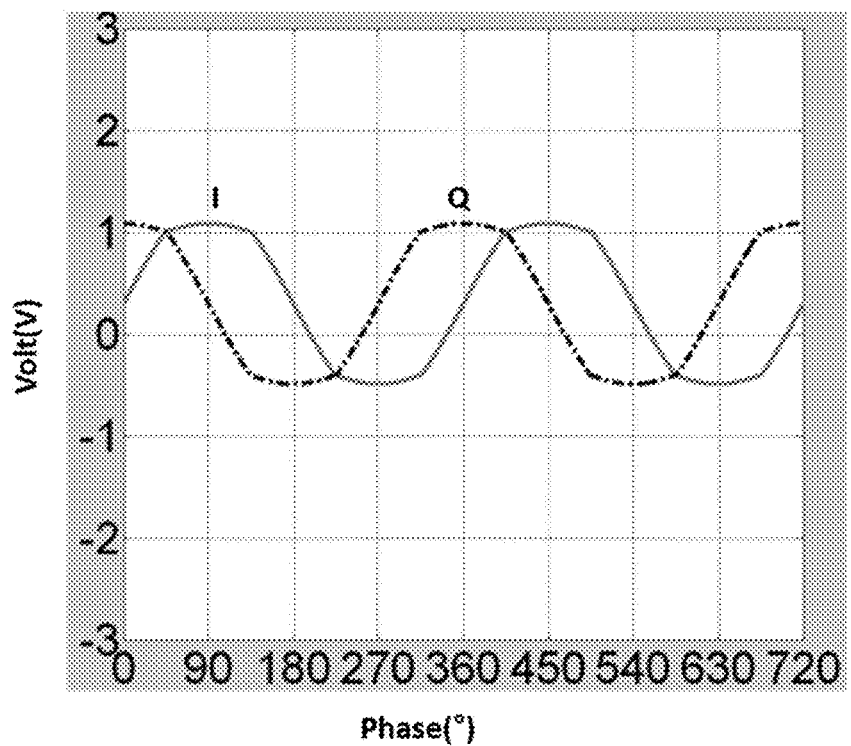
FIG. 6B plots when non-linear distorted I and Q signals are 0.3V DC offset added for computer simulation in the conventional I/Q demodulator.
Figure 6C:
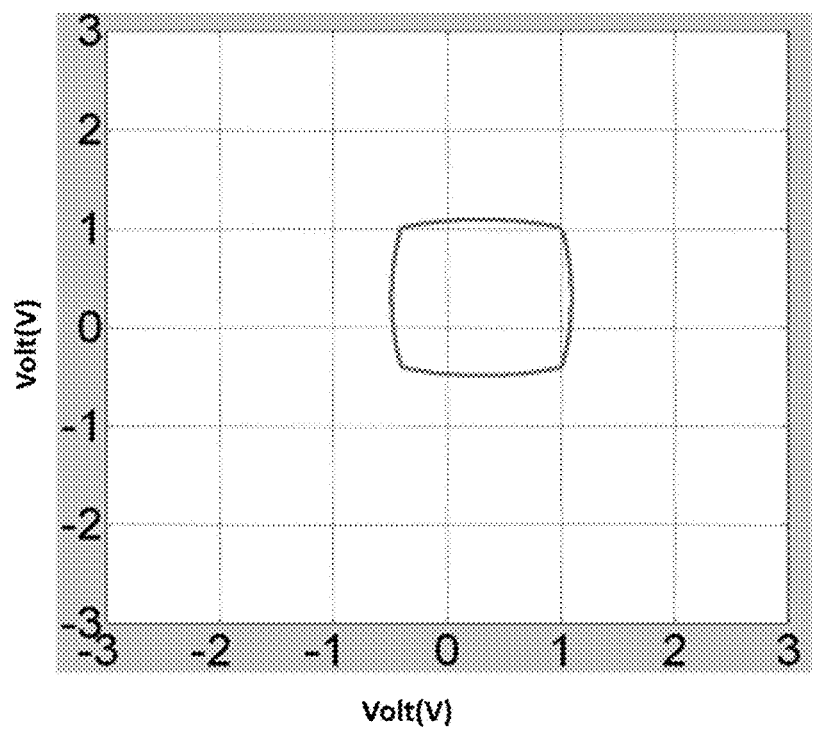
FIG. 6C plots a Lissajous graph of the I and Q signals in FIG. 6B in the conventional I/Q demodulator.
Figure 6D:
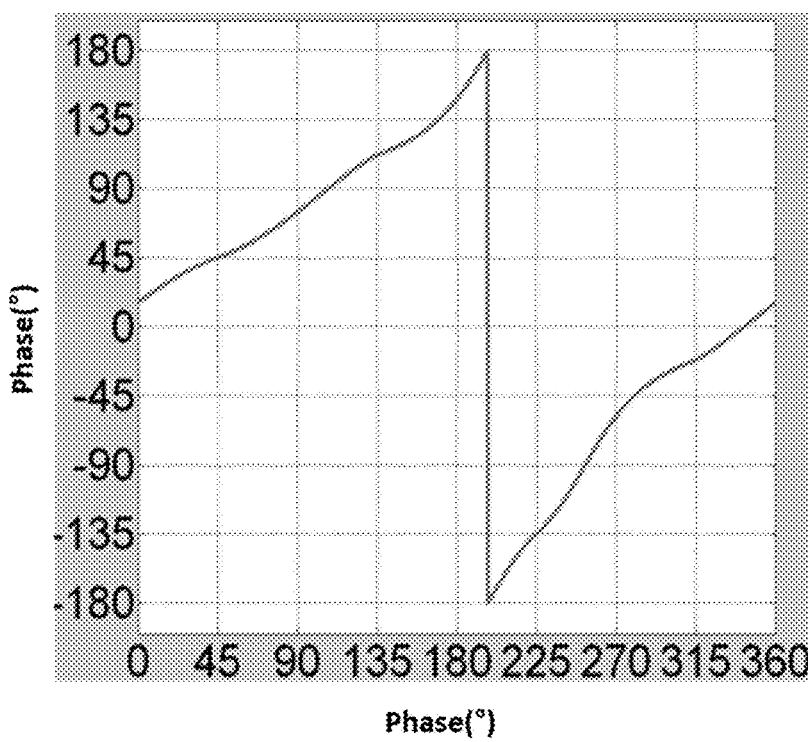
FIG. 6D plots a phase of the I and Q signals in FIG. 6B in the conventional I/Q demodulator.
Figure 6E:
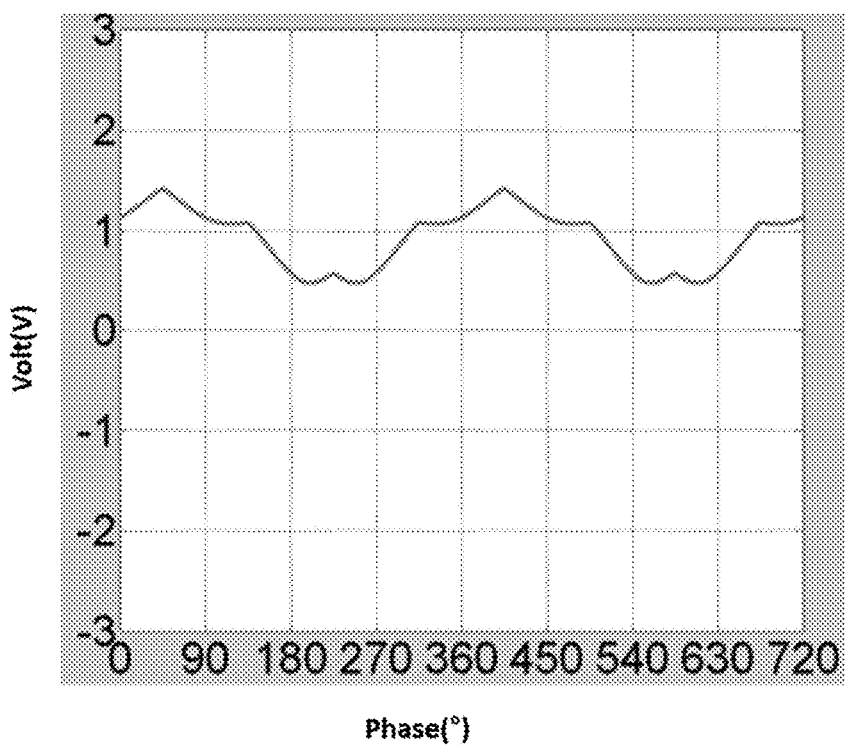
FIG. 6E plots an amplitude of the I and Q signals in FIG. 6B in the conventional I/Q demodulator.

When 0.3V DC offset is present, the distorted I and Q signals with DC offset are shown in FIG. 6A. FIG. 6B draws when the distorted I and Q output signals are added with the 0.3V DC offset for computer simulation. The Lissajous graph of the DC offset-added I and Q signals is shifted toward the right and upper corners, as drawn in FIG. 6C. Their phase $\varphi$ is even misaligned at 0° and 90°, as shown in FIG. 6D. The ripples of their absolute amplitude in FIG. 6E are also grown compared with those in FIG. 4E. In other words, due to the additional DC offset, the orthogonality between the I and Q signals is significantly more broken.

Figure 7A:
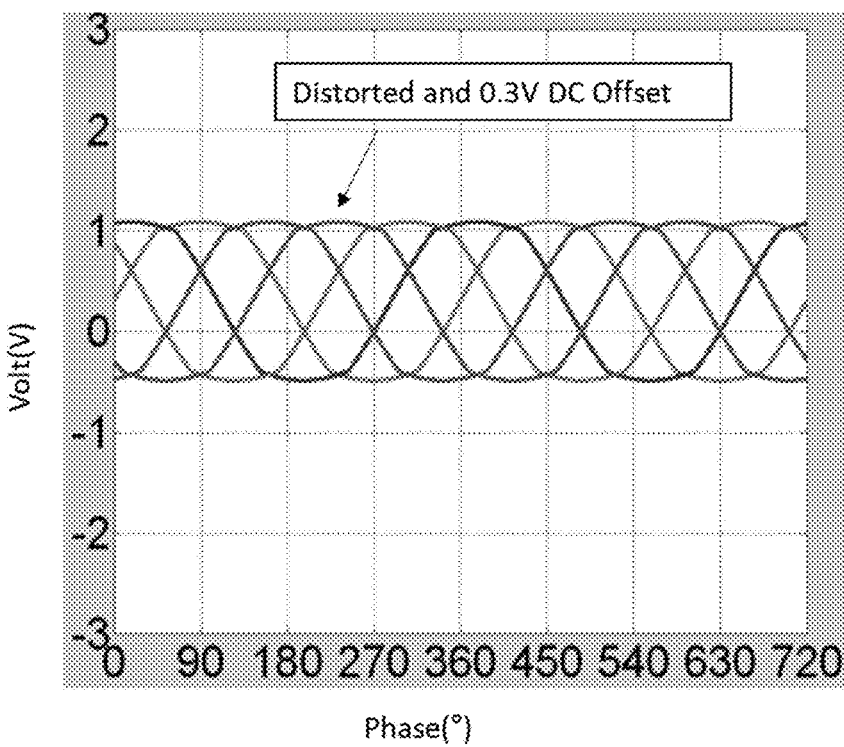
FIG. 7A plots when non-linear distorted 5-phase signals are 0.3V DC offset added for computer simulation in the 5-phase vector synthesis demodulator according to the present invention.
Figure 7B:
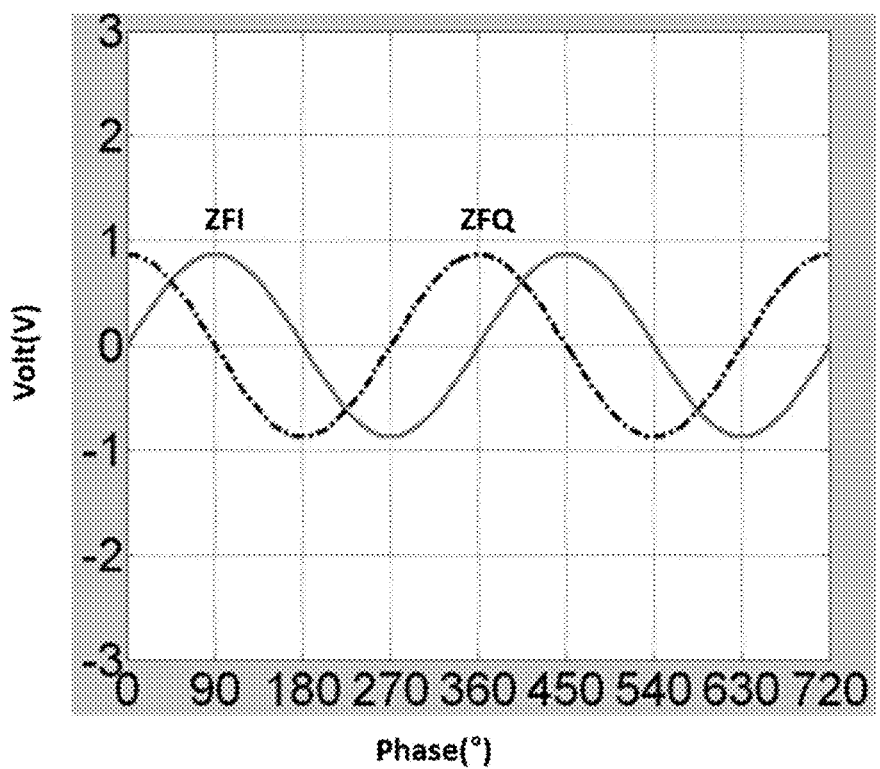
FIG. 7B plots ZFI and ZFQ signals at the ZF synthesizer output for the signals in FIG. 7A in the 5-phase vector synthesis demodulator according to the present invention.
Figure 7C:
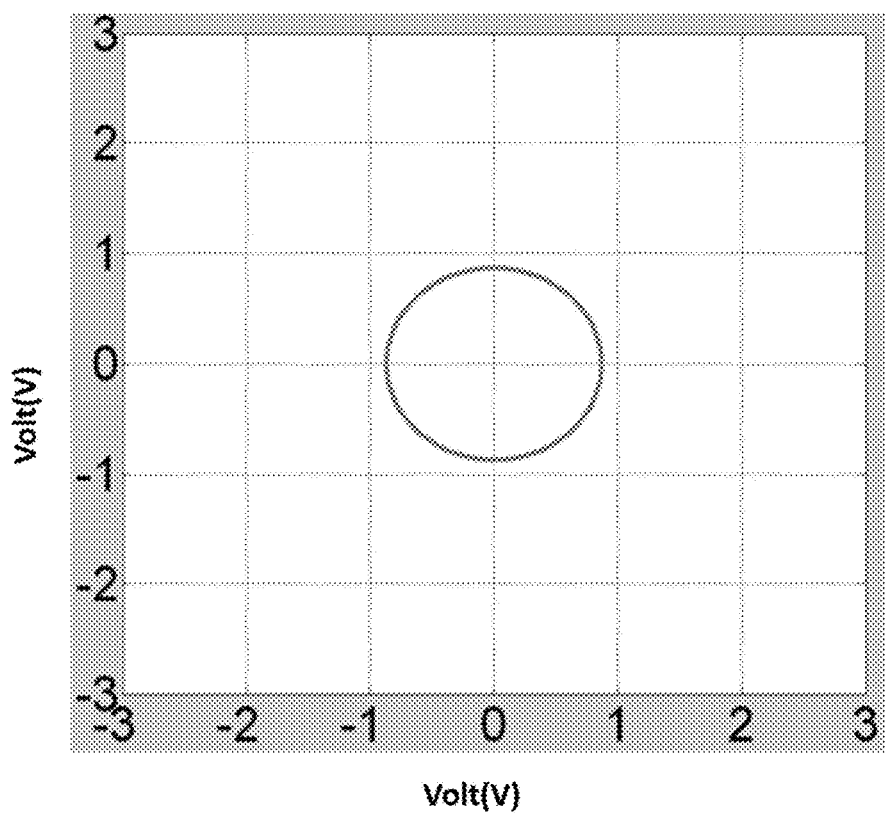
FIG. 7C plots a Lissajous graph of the ZFI and ZFQ signals in FIG. 7B in the 5-phase vector synthesis demodulator according to the present invention.
Figure 7D:
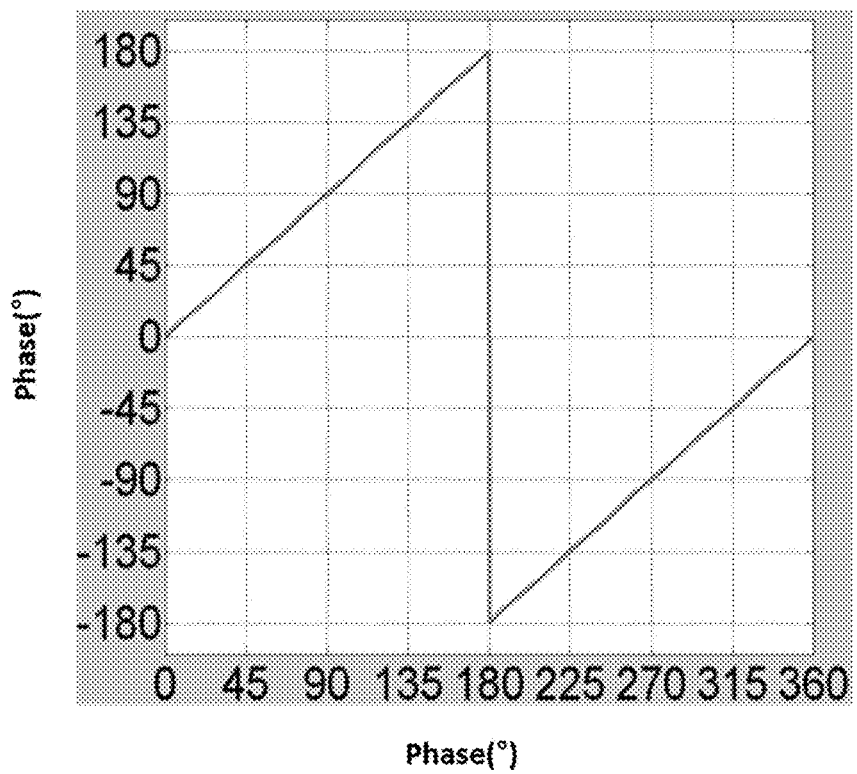
FIG. 7D plots a phase of the ZFI and ZFQ signals in FIG. 7B in the 5-phase vector synthesis demodulator according to the present invention.
Figure 7E:
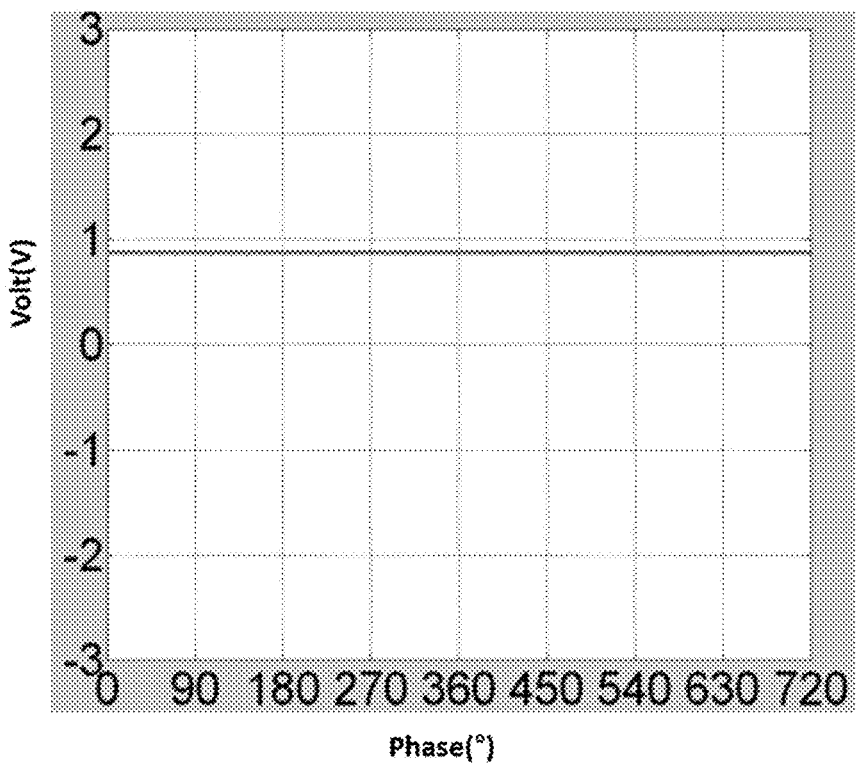
FIG. 7E plots an amplitude of the ZFI and ZFQ signals in FIG. 7B in the 5-phase vector synthesis demodulator according to the present invention.

When the same 0.3V DC offset is added to the distorted 5-phase signals, as drawn in FIG. 7A, the output signals (ZFI, ZFQ) of the 5-phase ZF synthesizer are very close to the ideal $\cos(\varphi)$ and $\sin(\varphi)$ signals. The Lissajous graph (FIG. 7C), phase $\varphi$ (FIG. 7D), and absolute amplitude r (FIG. 7E) of the ZFI and ZFQ are not shown to deviate greatly from those without DC offset cases in FIG. 5C, FIG. 5D, and FIG. 5E, respectively. This implies that the DC offset is substantially removed in the process the 5-phase ZF synthesis (EQ. (5)).

Figure 8A:
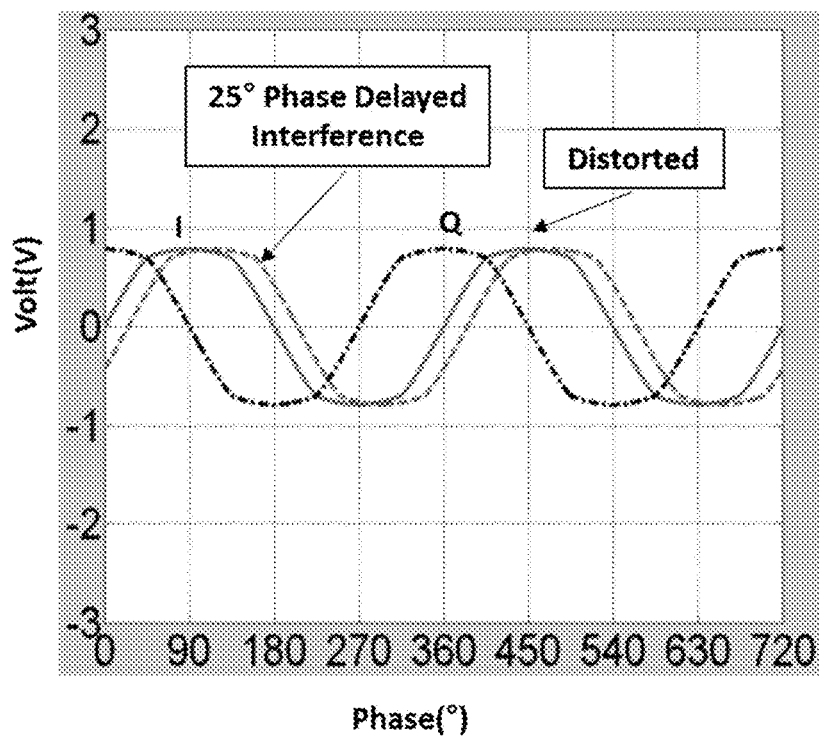
FIG. 8A plots non-linear distorted I and Q signals and a 25° phase-delay interference signal in the conventional I/Q demodulator.
Figure 8B:
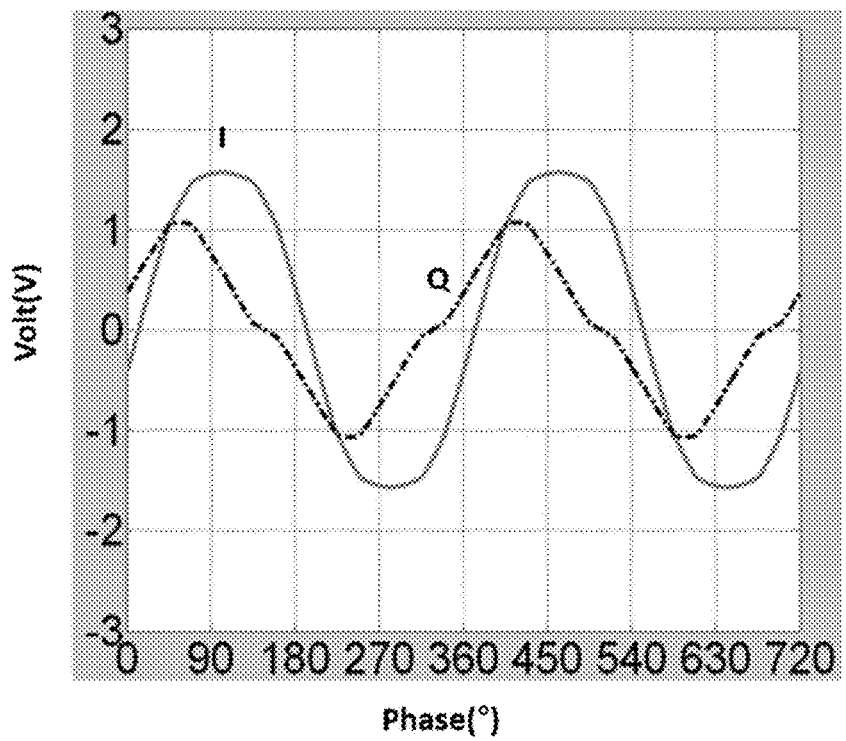
FIG. 8B plots I and Q signals when non-linear distorted I and Q signals are added with the 25° phase-delay interference signal for computer simulation in the conventional I/Q demodulator.
Figure 8C:
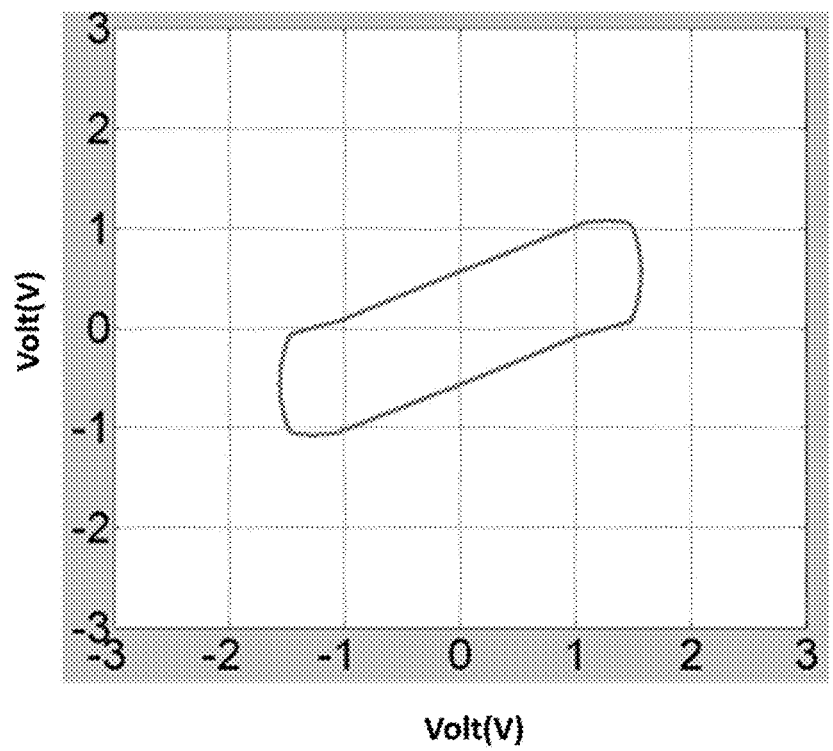
FIG. 8C plots a Lissajous graph of the I and Q signals in FIG. 8B in the conventional I/Q demodulator.
Figure 8D:
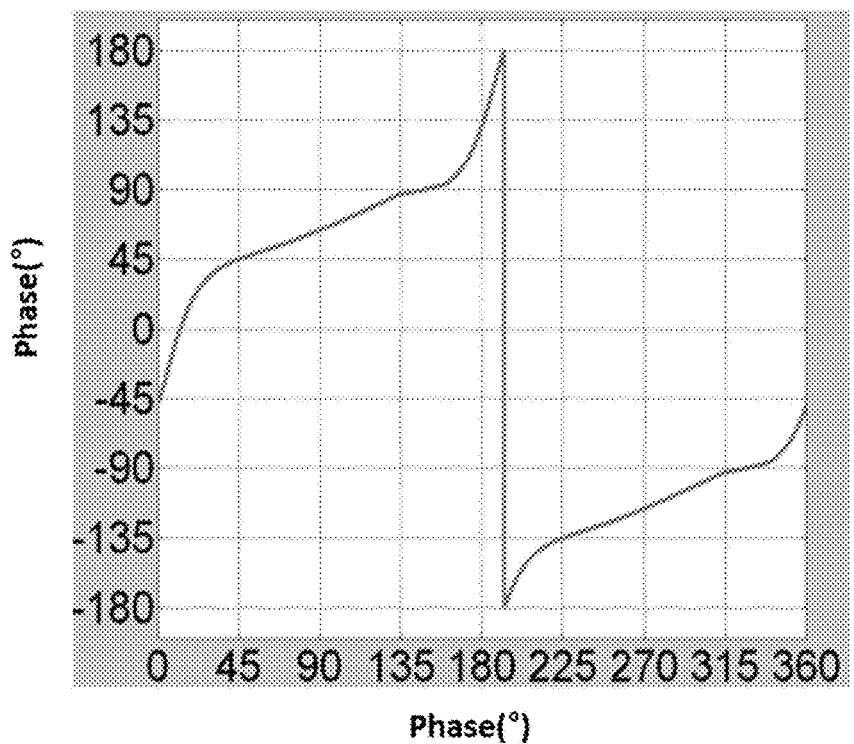
FIG. 8D plots a phase of the I and Q signals in FIG. 8B in the conventional I/Q demodulator.
Figure 8E:
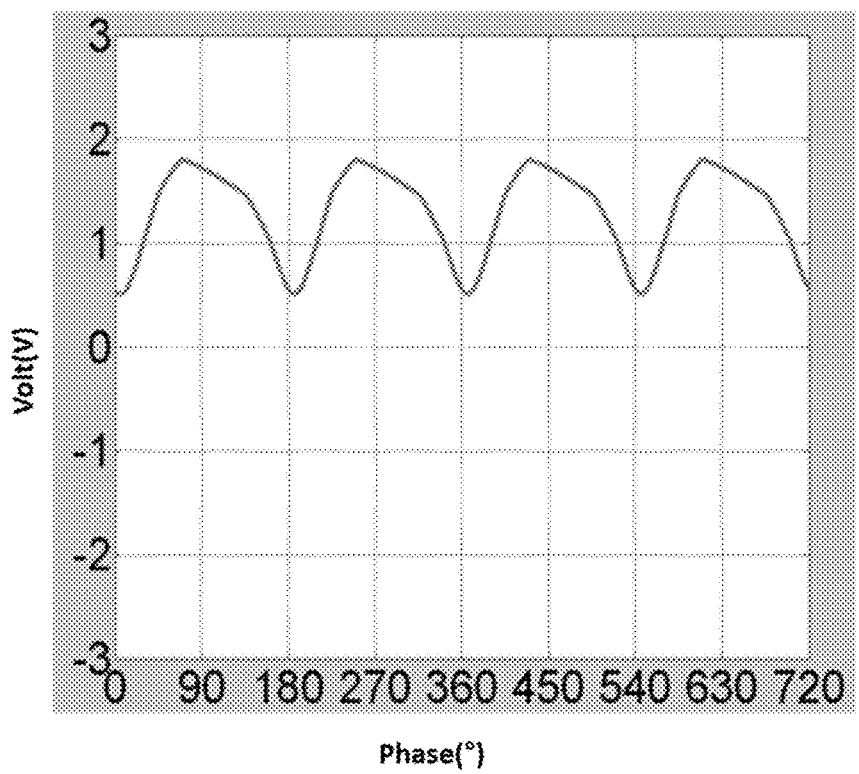
FIG. 8E plots an amplitude of the I and Q signals in FIG. 8B in the conventional I/Q demodulator.

When a 25° phase-delayed interference is present, the distorted I and Q signals with the interference are shown in FIG. 8A. FIG. 8B draws when the distorted I and Q output signals are added with the interference signal in the computer simulation. The Lissajous graph (FIG. 8C), phase $\varphi$ (FIG. 8D), and absolute amplitude r (FIG. 8E) show that the orthogonality between the I and Q signals is significantly broken. It is almost impractical to recover the transmitted message from the I and Q signals using the conventional demodulator.

Figure 9A:
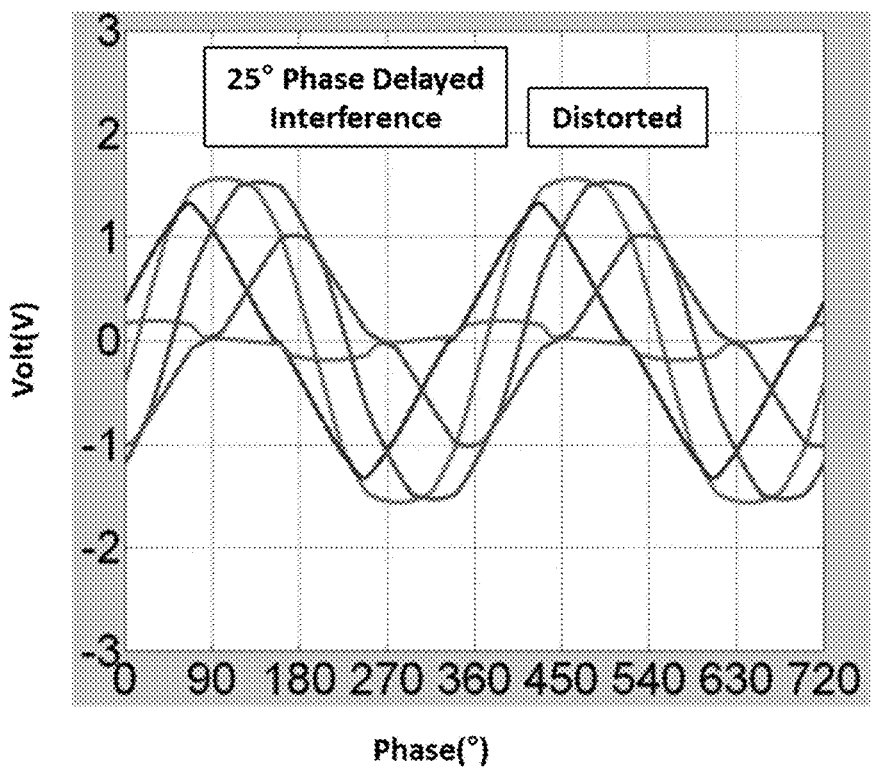
FIG. 9A plots when non-linear distorted 5-phase signals are added with a 25° phase-delay interference signal for computer simulation in the 5-phase vector synthesis demodulator according to the present invention.
Figure 9B:
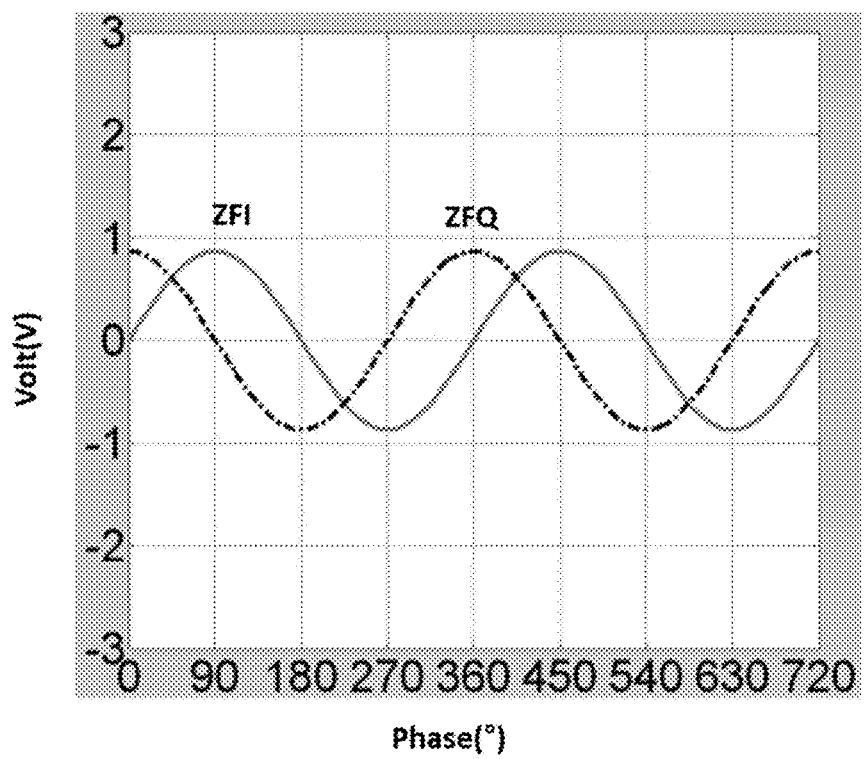
FIG. 9B plots ZFI and ZFQ signals at the ZF synthesizer output for the signals in FIG. 9A in the 5-phase vector synthesis demodulator according to the present invention.
Figure 9C:
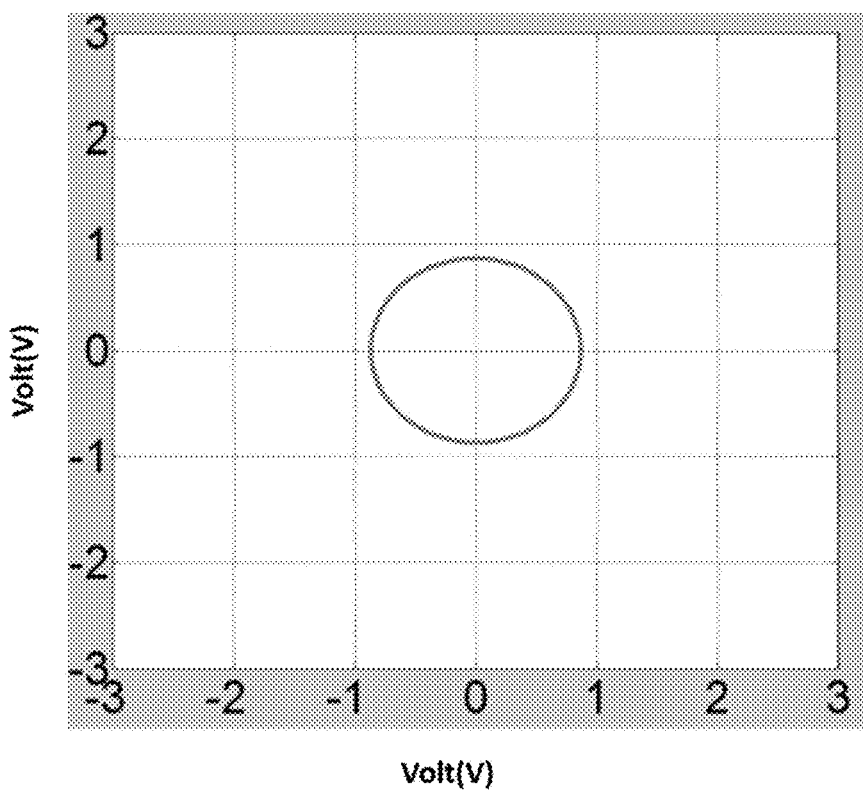
FIG. 9C plots a Lissajous graph of the ZFI and ZFQ signals in FIG. 9B in the 5-phase vector synthesis demodulator according to the present invention.
Figure 9D:
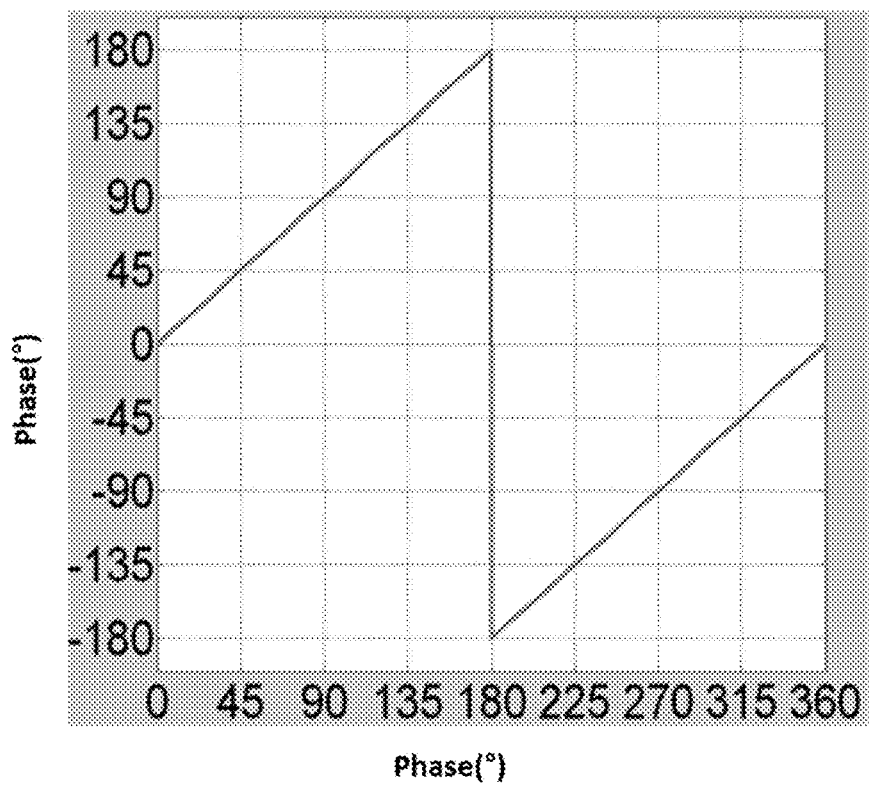
FIG. 9D plots a phase of the ZFI and ZFQ signals in FIG. 9B in the 5-phase vector synthesis demodulator according to the present invention.
Figure 9E:
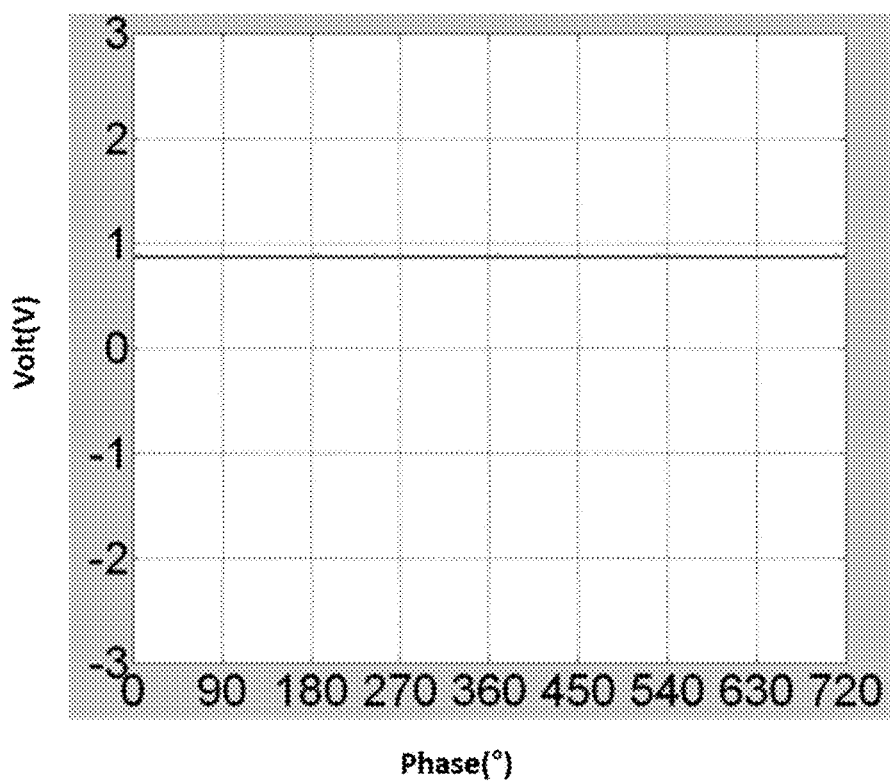
FIG. 9E plots an amplitude of the ZFI and ZFQ signals in FIG. 9B in the 5-phase vector synthesis demodulator according to the present invention.

With the same 25° phase delayed interference, FIG. 9A draws when distorted 5-phase signals are added with the interference in the computer simulation. The signals in FIG. 9A are also much distorted; however, the output signals (ZFI, ZFQ) of the 5-phase ZF synthesizer are very clean (FIG. 9B). The Lissajous graph (FIG. 9C), phase $\varphi$ (FIG. 9D), and absolute amplitude r (FIG. 9E) of the ZFI and ZFQ show that the orthogonality between these signals holds very well. This implies that the multi-phase demodulator is very robust even when a phase delayed interference is present.

Figure 10A:
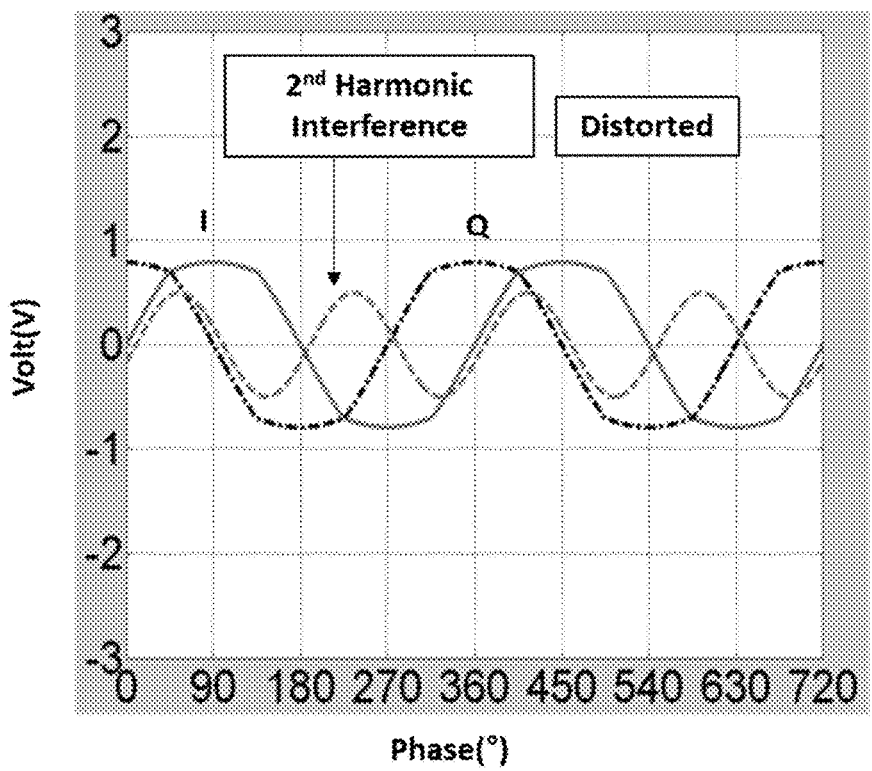
FIG. 10A plots non-linear distorted I and Q signals and a $2^{nd}$ harmonic interference in the conventional I/Q demodulator.
Figure 10B:
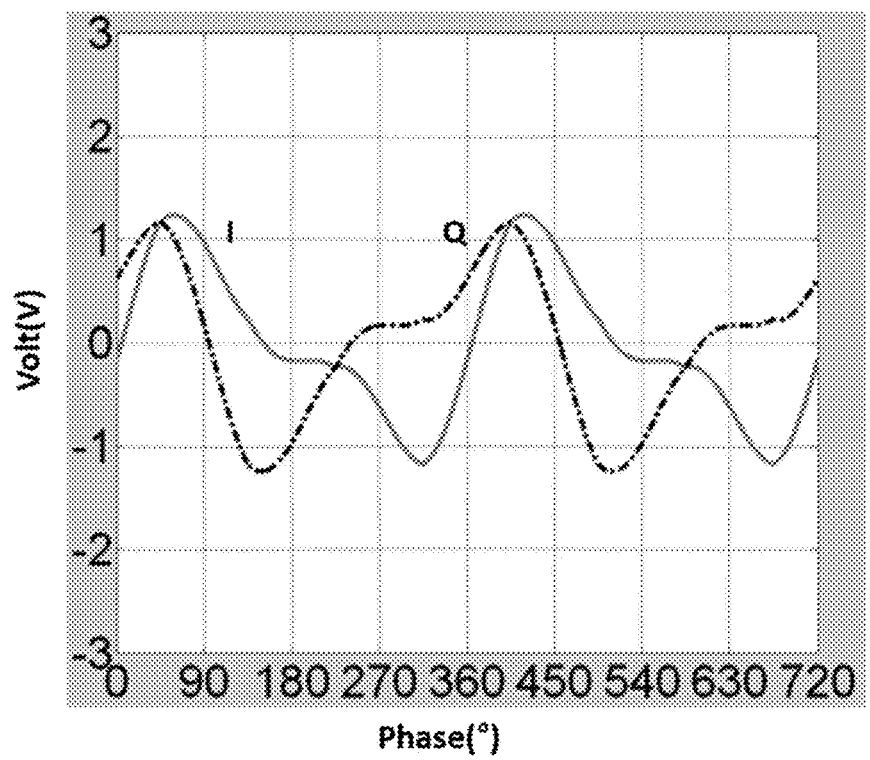
FIG. 10B plots I and Q signals when non-linear distorted I and Q signals are added with the $2^{nd}$ harmonic interference for computer simulation in the conventional I/Q demodulator.
Figure 10C:
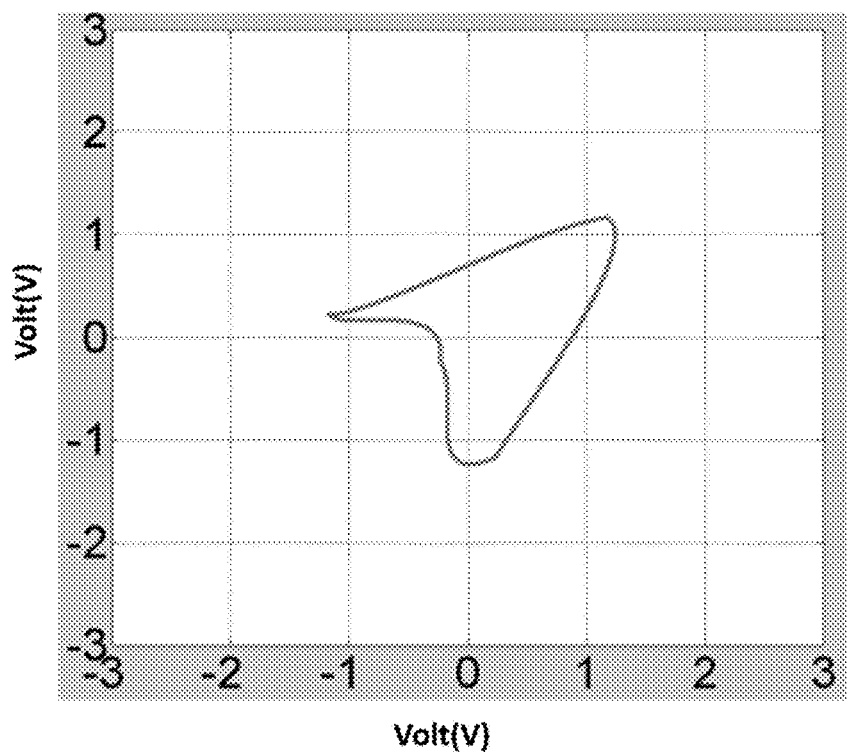
FIG. 10C plots a Lissajous graph of the I and Q signals in FIG. 10B in the conventional I/Q demodulator.
Figure 10D:
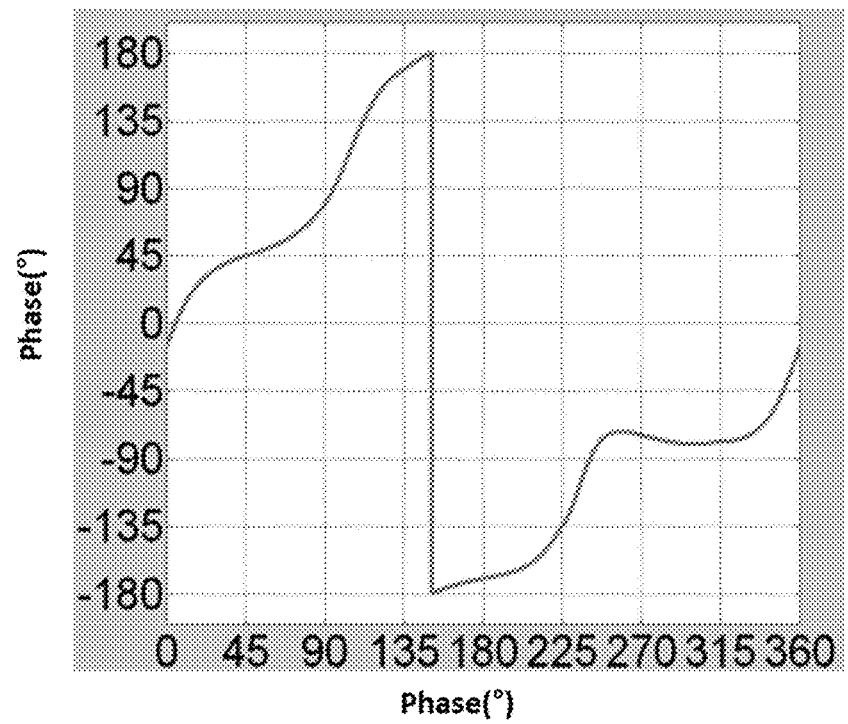
FIG. 10D plots a phase of the I and Q signals in FIG. 10B in the conventional I/Q demodulator.
Figure 10E:
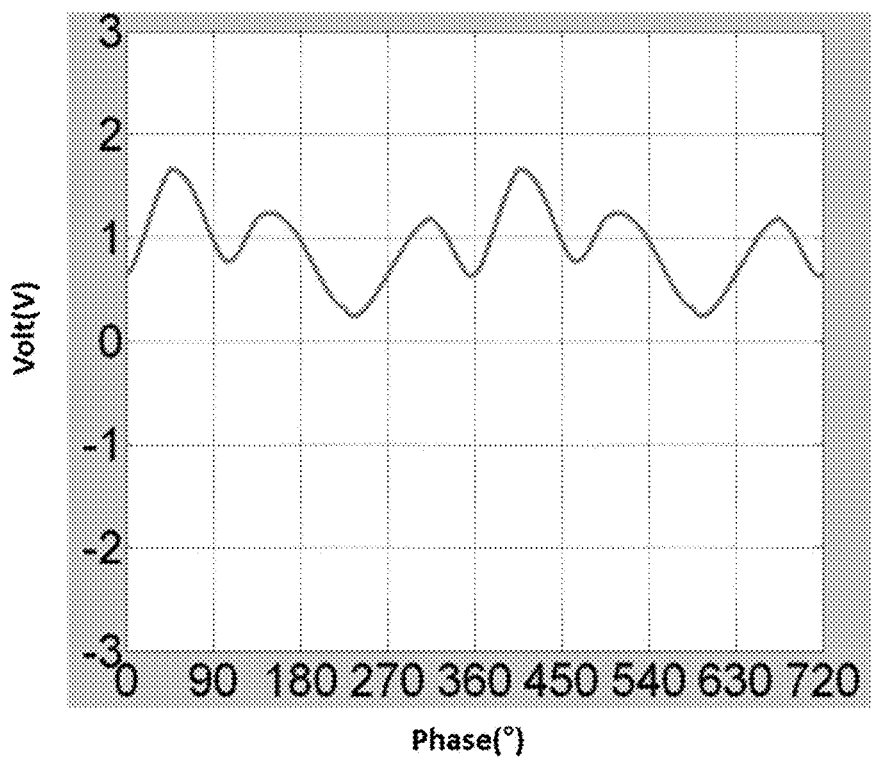
FIG. 10E plots an amplitude of the I and Q signals in FIG. 10B in the conventional I/Q demodulator.

When a $2^{nd}$ harmonic interference resides in the distorted I and Q signals (FIG. 10A), the signals in the computer simulation are shown to be very much distorted (FIG. 10B). As a consequence, the Lissajous graph (FIG. 10C) shows that the orthogonality between the I and Q signals is significantly broken. The phase $\varphi$ (FIG. 10D) and absolute amplitude r (FIG. 10E) are also much distorted.

Figure 11A:
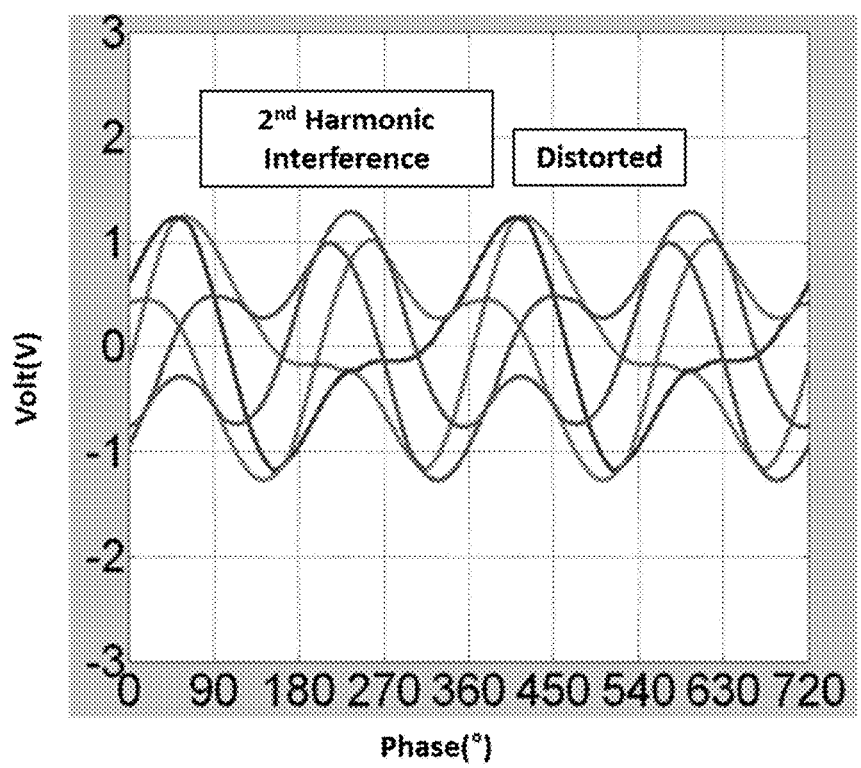
FIG. 11A plots when non-linear distorted 5-phase signals are added with the $2^{nd}$ harmonic interference for computer simulation in the 5-phase vector synthesis demodulator according to the present invention.
Figure 11B:
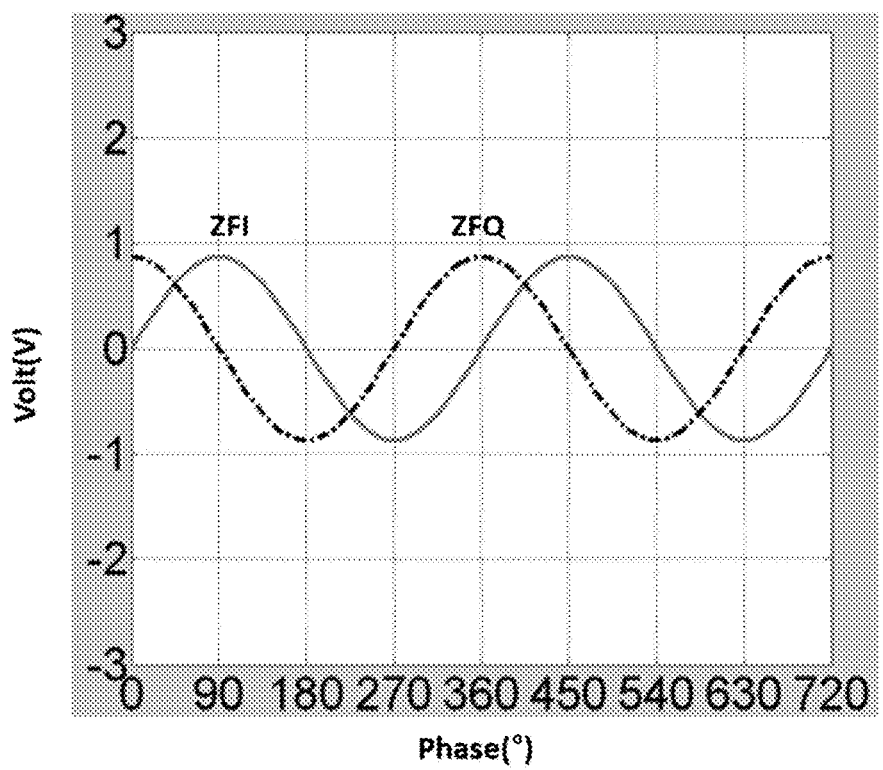
FIG. 11B plots ZFI and ZFQ signals at the ZF synthesizer output for the signals in FIG. 9A in the 5-phase vector synthesis demodulator according to the present invention.
Figure 11C:
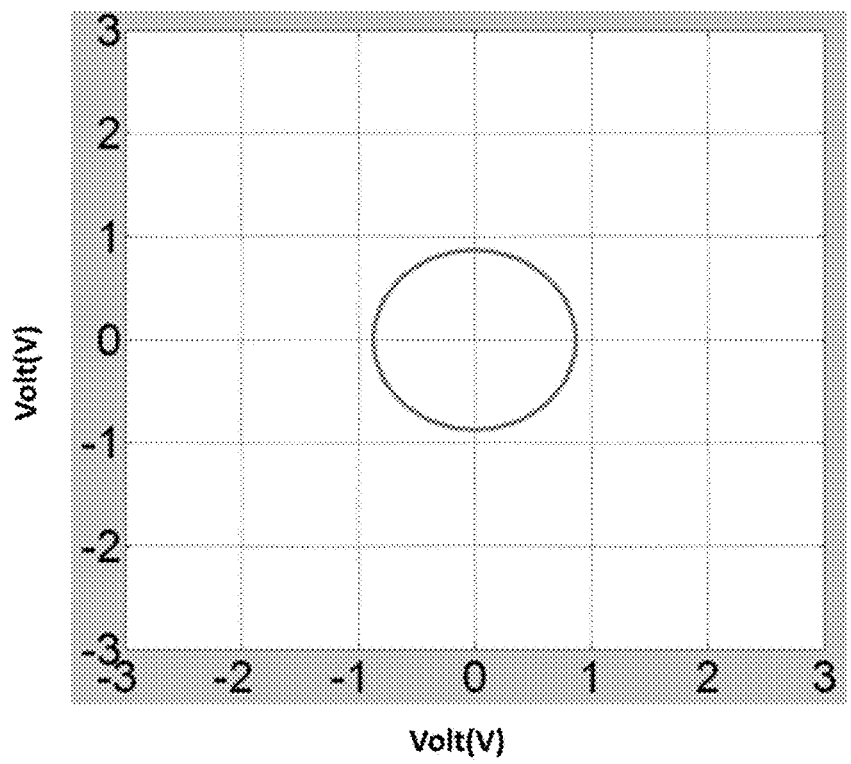
FIG. 11C plots a Lissajous graph of the ZFI and ZFQ signals in FIG. 11B in the 5-phase vector synthesis demodulator according to the present invention.
Figure 11D:
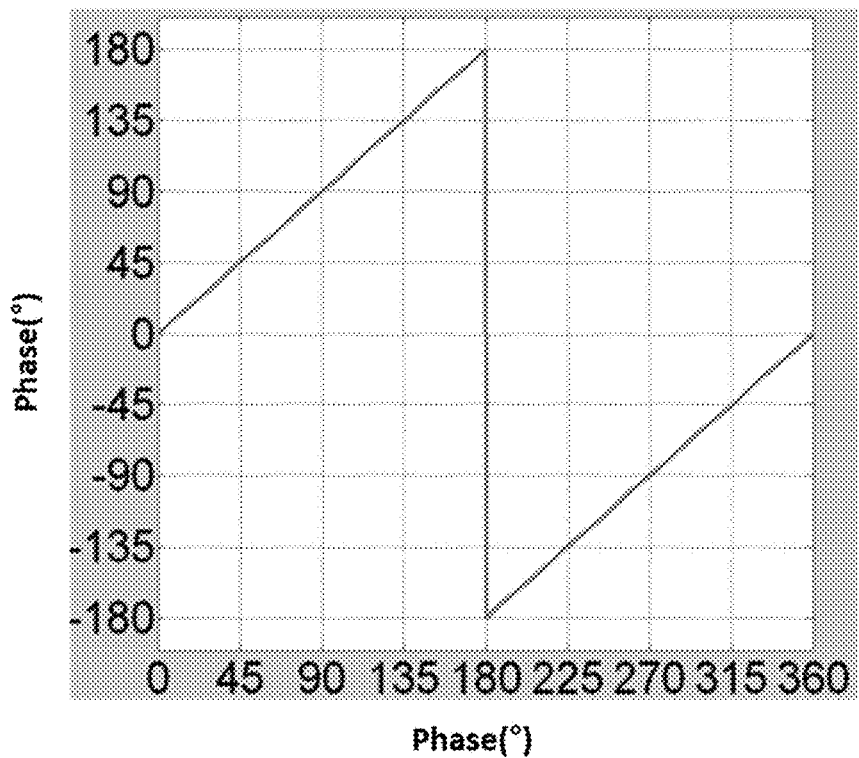
FIG. 11D plots a phase of the ZFI and ZFQ signals in FIG. 11B in the 5-phase vector synthesis demodulator according to the present invention.
Figure 11E:
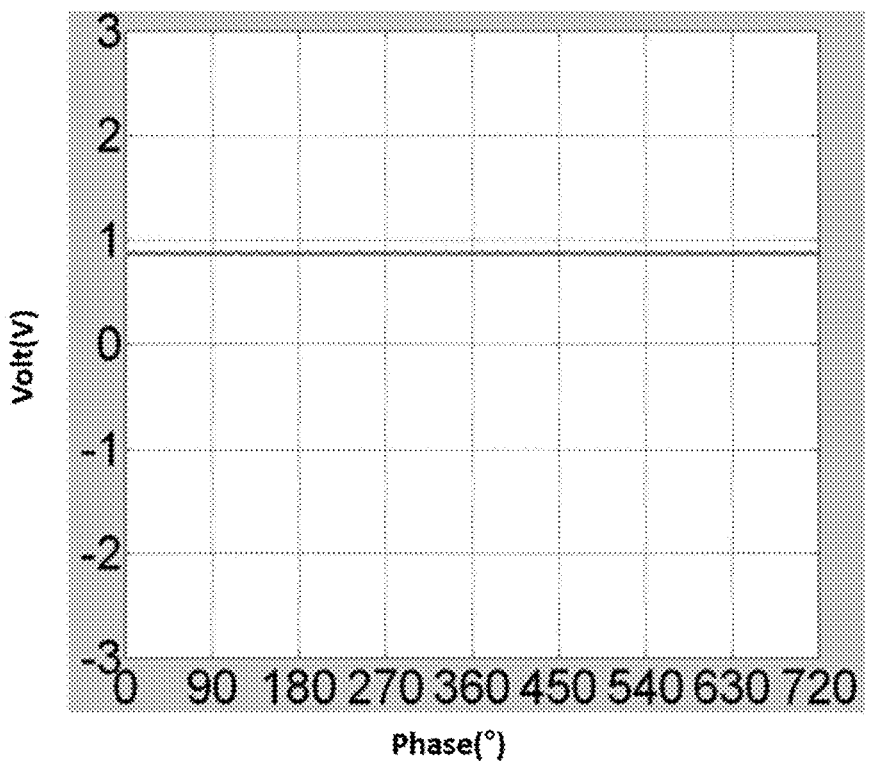
FIG. 11E plots an amplitude of the ZFI and ZFQ signals in FIG. 11B in the 5-phase vector synthesis demodulator according to the present invention.

When the same $2^{nd}$ harmonic interference is added to the distorted 5-phase signals (FIG. 11A) that are also shown to be much distorted, however, the 5-phase ZF synthesizer output signals (ZFI, ZFQ) are very close to the ideal $\cos(\varphi)$ and $\sin(\varphi)$ signals (FIG. 11B). The Lissajous graph (FIG. 11C), phase $\varphi$ (FIG. 11D), and absolute amplitude r (FIG. 11E) of the ZFI and ZFQ show that the multi-phase demodulator is very robust when harmonic distortions exist in the received signal.

The significant improvements of the in-phase and quadrature-phase signals under the various channel impairments achieved by the 5-phase demodulator over the conventional I/Q demodulator are made from the sampling of the received signal at 5-phase positions by 5-phase mixers and by synthesizing the five sampled signals in an optimal way using the 5-phase ZF synthesizer. Therefore, as the N number in the N-phase demodulator increases, the more improved performance is expected at the expense of increased hardware and/or software costs in realization.

The multi-phase demodulator can be applied to any type of baseband waveform, including a square-waveform, as long as it has a complementary distribution. The complementary distribution of a periodic signal implies that integration of the signal from 0° to 180° of the signal is complementary with that from 180° to 360°. Therefore, the addition of integrations 0°~180° and 180°~360° becomes 0 for a complementary distribution signal.

The multi-phase demodulator can be equally applied to multi-carrier (MC) communication systems as well as the single-carrier systems shown above. In the multi-phase demodulation of an MC modulated (or OFDM) signal, each multi-phase demodulator requires the independent running of each of its sub-carrier signals.

Applications

One of many advantageous applications of the multi-phase vector synthesis demodulation method is to achieve fine synchronization between the transmitter and receiver in digital communication systems utilizing the linear phase property of $\varphi=\arctan(ZFI/ZFQ)$, as shown in the exemplary 5-phase demodulator case.

Typically, timing alignment among base-stations in a mobile cellular network relies on GPS clock synchronization. On the other hand, a delay-code synchronization scheme can be used to achieve fine synchronization in asynchronous mobile cellular communication networks. A unique delay-code is assigned to each of the stations, and, at each of these stations, in reference to the input synchronous signal, a synchronous signal with its own delay code is generated and transmitted to the next station.

Figure 12A:
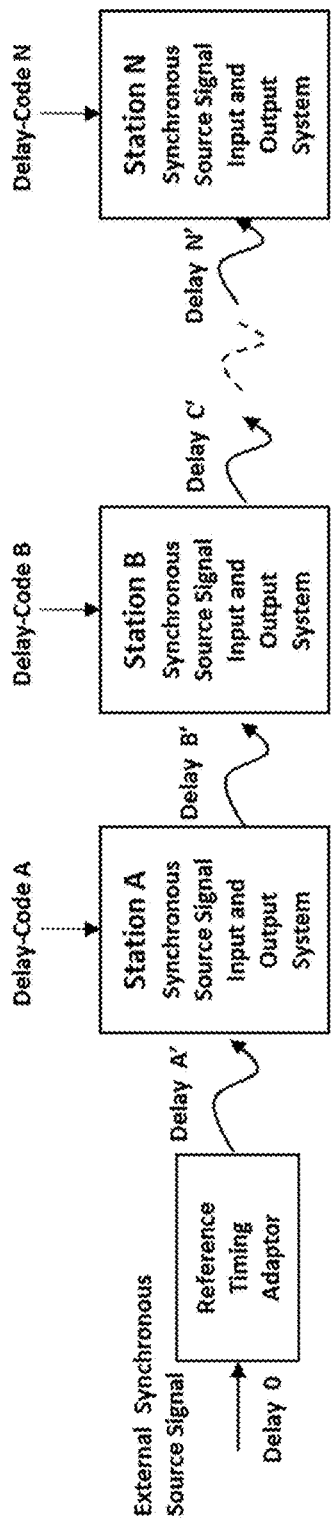
FIG. 12A illustrates a conceptual diagram of the delay-code synchronization scheme.

A conceptual diagram of the delay-code synchronization scheme is drawn in FIG. 12A, where an external synchronous source signal is used as an input signal to a reference timing adaptor. The reference timing adaptor transmits a delay signal, Delay A', to Station A at Delay 0. Station A receives the delay signal Delay A' and adjusts the internal clock phase to synchronize with Delay-Code A until A=A'; it then transmits a delay signal Delay B'. Station B receives the delay-signal, Delay B', and adjusts the internal clock phase to synchronize with Delay-Code B until B=B'; it then transmits the delay signal Delay B', and so on. Likewise, Station N receives a delay signal, Delay N', from the Station (N−1) and adjusts the internal clock phase to synchronize with Delay-Code N until N=N'. Throughout this sequential delay signal transmission and delay-code synchronization, the clock phases are synchronized among all the stations.

Figure 12B:
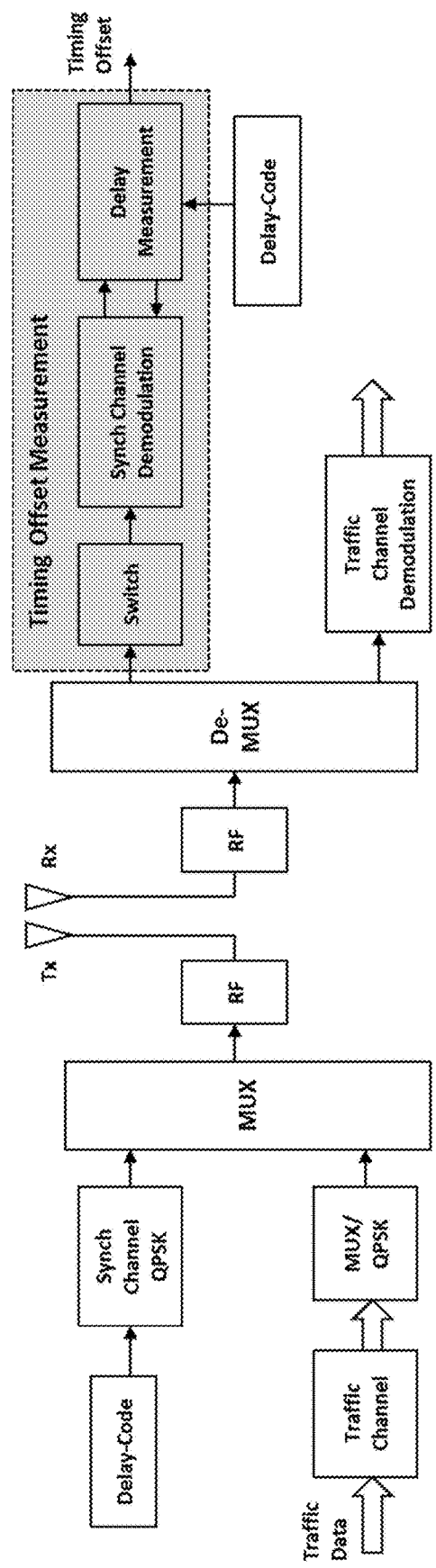
FIG. 12B illustrates a simplified block diagram of a transceiver employing the delay-code synchronization scheme according to the present invention.

In FIG. 12B, a simplified block diagram of a transceiver employing the delay-code synchronization scheme is illustrated. At the transmitter, a delay-code is QPSK modulated and transmitted through a Synch Channel. At the receiver, the received delay-code signal is demodulated and the timing offset is calculated via comparison with the delay-code assigned to the station. The receiver remains adjusting the receiver clock phase until the timing matches with the received delay-code in the Timing Offset Measurement block. Data transmission is initiated after the synchronization is achieved.

To obtain an accurate timing offset calculation, the linearity of a Synch Channel Demodulator in the Timing Offset Measurement block plays a major role. As shown in the simulation results above, the multi-phase demodulator provides a superior linearity response in terms of both the phase ($\varphi=\arctan(ZFI/ZFQ)$) and amplitude ($r=\sqrt{ZFI^2+ZFQ^2}$) under various channel impairments.

The applications of novel multi-phase vector synthesis demodulation are diverse, including interference reduction in sub-carrier signals in multi-carrier (MC) code-division multiple access (CDMA) or OFDM IEEE802.11x communications, robust reception at mobile terminals under higher speed moving, an increased signal-to-noise ratio (SNR) at the receiver in space communications, and improved diversity reception at lake receivers.

The components described in the example embodiments may be implemented by hardware components including, for example, at least one register-transfer-level (RTL) hardware modules, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a non-transitory computer-readable storage medium. The components, the functions, and the processes described in the example embodiments may be implemented by a combination of hardware and software. The method according to the example embodiments may be embodied as a program that is executable by a computer, and may be implemented as various computer-readable storage media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from read-only memory or random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read-only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit. Also, non-transitory computer-readable media may be any available media that may be accessed by a computer, and may include both computer storage media and transmission media. In addition, it should be understood that the above-described program components and apparatuses may be incorporated into a single software product or may be packaged in multiple software products.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A demodulation apparatus at a receiver of communications systems that transmit one or more carrier modulated signals, the demodulation apparatus comprising:
   one or more local oscillators for generating an N number of phase-shifted carrier signals, of which frequency is used to make an inter-mediate frequency that is lower than the carrier frequency, wherein each phase of the N number of phase-shifted carrier signals is successively and equally shifted by 360°/N, where N is an odd number greater than or equal to 3;
   an N number of mixers for mixing a received signal with the N number of phase-shifted carrier signals and producing N-phase mixed signals;
   an N number of band-pass filters for band-pass filtering the N-phase mixed signals and obtaining N-phase demodulated baseband signals by filtering out carrier signal components; and
   an N-phase zero-force synthesizer for synthesizing in-phase (I) and quadrature-phase (Q) signals from the N-phase demodulated baseband signals, wherein synthesis coefficients and gain are pre-determined.

* * * * *